US012058398B1

(12) United States Patent
Kozuback et al.

(10) Patent No.: US 12,058,398 B1
(45) Date of Patent: Aug. 6, 2024

(54) TECHNIQUES FOR GENERATING VIDEO TRACKS BASED ON USER PREFERENCES

(71) Applicant: NETFLIX, INC., Los Gatos, CA (US)

(72) Inventors: Tara Lynn Kozuback, Los Angeles, CA (US); Thomas Edward Leach, Gloucestershire (GB); Carenina Garcia Motion, San Jose, CA (US); Mark Howard Perry, San Jose, CA (US); Kenneth Raymond Thomas, Santa Clara, CA (US)

(73) Assignee: NETFLIX, INC., Los Gatos, CA (US)

( * ) Notice: Subject to any disclaimer, the term of this patent is extended or adjusted under 35 U.S.C. 154(b) by 0 days.

(21) Appl. No.: 18/169,765

(22) Filed: Feb. 15, 2023

(51) Int. Cl.
*H04N 21/2668* (2011.01)
*H04N 21/258* (2011.01)
*H04N 21/8549* (2011.01)
*H04N 21/858* (2011.01)

(52) U.S. Cl.
CPC .... *H04N 21/2668* (2013.01); *H04N 21/25891* (2013.01); *H04N 21/8549* (2013.01); *H04N 21/8586* (2013.01)

(58) Field of Classification Search
None
See application file for complete search history.

(56) References Cited

U.S. PATENT DOCUMENTS

| | | |
|---|---|---|
| 10,771,824 B1 | 9/2020 | Haritaoglu et al. |
| 10,972,809 B1* | 4/2021 | Key ................ H04N 21/23439 |
| 11,039,181 B1 | 6/2021 | Haritaoglu et al. |
| 2012/0023251 A1 | 1/2012 | Pyle et al. |
| 2014/0208351 A1 | 7/2014 | Moore |
| 2015/0127845 A1 | 5/2015 | Phillips et al. |
| 2018/0063602 A1* | 3/2018 | Kalish ............. H04N 21/47202 |
| 2018/0159916 A1 | 6/2018 | Bowen |
| 2018/0192110 A1* | 7/2018 | Loheide .......... H04N 21/26258 |
| 2020/0396273 A1 | 12/2020 | Amidei et al. |
| 2021/0385264 A1 | 12/2021 | Robertson et al. |
| 2023/0019723 A1 | 1/2023 | Adams Ryan et al. |

OTHER PUBLICATIONS

International Search Report for Application No. PCT/US2024/014931 dated Apr. 18, 2024.

(Continued)

*Primary Examiner* — James R Marandi
(74) *Attorney, Agent, or Firm* — Artegis Law Group, LLP

(57) ABSTRACT

In various embodiments, a manifest customization application generates presentations of media titles for playback. The manifest customization application selects a first set of video streams from multiple sets of video steams that are associated with a media title and included in a media package video streams based on a first preference associated with a user. The manifest customization application selects a first set audio streams from multiple sets of audio streams included in the media package based on a second preference associated with the user. The manifest customization application generates a recommended presentation based on the first set of video streams and the first set of audio streams. The manifest customization application generates a manifest file that allows the media title to be played back in accordance with at least the recommended presentation.

20 Claims, 7 Drawing Sheets

(56) References Cited

OTHER PUBLICATIONS

International Search Report for Application No. PCT/US2024/014936 dated Apr. 19, 2024.
Non Final Office Action received for U.S. Appl. No. 18/169,755 dated Mar. 14, 2024, 12 pages.
Non Final Office Action received for U.S. Appl. No. 18/169,783 dated Apr. 11, 2024, 17 pages.
International Search Report for Application No. PCT/US2024/014942 dated Apr. 23, 2024.
Final Office Action received for U.S. Appl. No. 18/169,755 dated Jun. 21, 2024, 25 pages.

* cited by examiner

Inclusive Media Package 130

Title Metadata Set 210
*titleID, runtime, segmentDefinitions, baselineVideoID, fallbackVideoID*

| | | | |
|---|---|---|---|
| Video Stream Set 220(1) | Video Metadata Set 230(1)<br>language:en;<br>videoType:original | 220(2) | 230(2)<br>language:fr;<br>videoType:localized | 220(3)<br>230(3)<br>language:es;<br>videoType:localized |
| Audio Stream Set 240(1) | Audio Metadata Set 250(1)<br>videoID:1; language:en;<br>audioType:original | 240(2) | 250(2)<br>language:fr;<br>audioType:dubbed | 240(3)<br>250(3)<br>language:es;<br>audioType:dubbed |
| 240(4)<br>language:en;<br>audioType:description | 240(5) | 250(5)<br>language:fr;<br>audioType:description | 240(6)<br>250(6)<br>language:es;<br>audioType:description |
| Timed Text Stream Set 260(1) | Timed Text Metadata Set 270(1)<br>language:en;<br>timedTextType:subtitle;<br>timedTextSubtype:full | 260(2) | 270(2)<br>language:fr;<br>timedTextType:subtitle;<br>timedTextSubtype:full | 260(3)<br>270(3)<br>language:es;<br>timedTextType:subtitle;<br>timedTextSubtype:full |
| 260(4) | 270(4)<br>language:en;<br>timedTextType:subtitle;<br>timedTextSubtype:partial | 260(5) | 270(5)<br>language:fr;<br>timedTextType:subtitle;<br>timedTextSubtype:partial | 260(6)<br>270(6)<br>language:es;<br>timedTextType:subtitle;<br>timedTextSubtype:partial |

FIGURE 2

Manifest File 174

Recommended Server Device 310
= 150

Title Description 320
= 210

Recommended Presentation 330(1)
= tracks associated with 340, 350(1), 360(1)

330(2) = tracks associated with 340, 350(1), 360(2)

330(3) = tracks associated with 340, 350(1)

330(3) = tracks associated with 340, 350(2), 360(1)

330(5) = tracks associated with 340, 350(2), 360(2)

330(6) = tracks associated with 340, 350(2)

Video Track Description 340
for English original video track

Audio Track Description 350(1)
for English original audio track

350(2) for English audio description track

Timed Text Track Description 360(1)
for English partial subtitle track

360(2) for Spanish full subtitle track

Alternate Video Track Summary 370(1)
associated with a Spanish localized video stream set 370(2)
associated with a French localized video stream set

FIGURE 3

Alternate Manifest File 178
*for French localized video track*

Recommended Server Device 410
= *150*

Title Description 320
= *210*

Recommended Presentation 430(1)
= *tracks associated with 440, 450(1), 460(1)*

430(2) = *tracks associated with 440, 450(1), 460(2)*

430(3) = *tracks associated with 440, 450(1)*

430(4) = *tracks associated with 440, 450(2), 460(1)*

430(5) = *tracks associated with 440, 450(2), 460(2)*

430(6) = *tracks associated with 440, 450(2)*

Video Track Description 440
*for French localized video track*

Audio Track Description 450(1)
*for French dubbed audio track*

450(2) *for French audio description track*

Timed Text Track Description 460(1)
*for English full subtitle track*

460(2) *for French partial subtitle track*

Alternate Video Track Summary 470(1)
*associated with an English original video stream set*

470(2)
*associated with a Spanish localized video stream set*

FIGURE 4

TECHNIQUES FOR GENERATING VIDEO TRACKS BASED ON USER PREFERENCES

BACKGROUND

Field of the Various Embodiments

The various embodiments relate generally to computer science and to media streaming technology and, more specifically, to techniques for generating video tracks based on user preferences.

DESCRIPTION OF THE RELATED ART

In a process known as "video localization," an original video source file associated with a given media title is modified to generate a localized video source file that conforms more to the individual preferences of a target audience. For example, English text that appears in an original video source file could be replaced with comparable French text to generate a localized video source file that conforms more to the preferences of a French-speaking target audience. In another example, a hockey scene in an original video source file could be replaced with a soccer scene to reflect the sporting preferences of a target audience that lives in Brazil.

A typical media title can be streamed and played back via one or more presentations, where each presentation includes a video track, an audio track, and an optional timed text track that are derived, respectively, from a different video source file, a different audio source file, and a different optional timed text source file. Each track specifies either a single stream or multiple streams that usually correspond to different bitrates, where a given stream constitutes an encoded version of a source file.

To enable a client device to stream and playback different presentations of a media title, a media processing pipeline is used to independently generate a different video-specific package for each video source file associated with the media file. To generate a video-specific package for a given video source file, one or more target presentation(s) are defined based on the preferences of target audiences and compatibility with the corresponding video source file. The audio source file(s) and any optional timed text source file(s) required to generate the target presentations(s) are identified. For each of the single video source file, the one or more identified audio source file(s), and the zero or more identified timed text source file(s), the media processing pipeline generates a different set of one or more corresponding streams, referred to as a "stream set." The media processing pipeline then generates a video-specific package that includes the stream sets, stores the video-specific package in an original server device, and then deploys the video-specific package from the origin server device to a content delivery network.

To playback the media title, an endpoint application executing on a client device requests a manifest file for the media title from cloud-based media services. In response to the manifest file request, a manifest application selects an edge server within the content delivery network that is proximate to the client device. The manifest application then selects a video-specific package for the media title based on one or more characteristics associated with the user (e.g., a profile language). A profile language for a user specifies the language of user interfaces that the streaming media provider uses to interact with the user. Subsequently, the manifest application generates at least one recommended presentation based on the single video stream set, the audio stream set(s), and the optional timed text stream set(s) included in the selected video-specific package. Each recommended presentation includes the same video track that specifies a subset of the video stream set and a different combination of an audio track that specifies a subset of an audio stream set and an optional timed text track that specifies a subset of a timed text stream set. The manifest application generates and transmits a manifest file to the endpoint application, where the manifest file enables the endpoint application to determine the selected edge server and select the tracks in any recommended presentation. To playback each portion or "segment" of the media title, the endpoint application selects a corresponding segment from a stream in each selected track and requests the selected segments from the selected edge server device. In some implementations, the endpoint application can switch between two or more recommended presentations during the playback of the media title.

One drawback of the above approach is that each audio source file and each timed text source file used to generate more than one video-specific package ends up being redundantly processed by the media processing pipeline. As a result, unnecessary amounts of storage resources, processing resources, and time are consumed in generating and deploying the different video-specific packages to the content delivery network. For example, with the above approach, if a Spanish audio source file were included in five different video-specific packages, then the Spanish audio source file would end up being encoded five different times at one or more different bitrates to generate five separate audio stream sets, and all five audio stream sets would include the same audio stream(s). The five audio stream sets also would be separately assessed for quality and separately deployed to the content delivery network. In such a scenario, storage resources, processing resources, and time are unnecessarily consumed in generating, processing, and deploying the audio streams associated with four of the five video-specific packages.

Another drawback of the above approach is that the number of different recommended presentations of a media title made available to each user can be unnecessarily limited. In that regard, the recommended presentations specified in a given manifest file are generated based on the subset of the stream sets associated with the media title that are actually included in one video-specific package. In other words, the recommended presentations are generated based on the single video stream set, the one or more audio stream sets, and the zero or more timed text steam sets that are included in the selected video-specific package. Accordingly, if the preferences of a given user differ from the preferences of the target audience(s) associated with the selected video-specific package, then the quality of the viewing experience for the given user is likely to be subpar. For example, suppose that a video-specific package for a media title included a Spanish video stream set, an English original audio stream set, and a Spanish dubbed audio stream set, but omitted a Polish dubbed audio stream set. The manifest file generated for a user associated with a profile language of Spanish and an audio preference of Polish would include one recommended presentation specifying both a Spanish localized video track and a Spanish dubbed audio track and another recommended presentation specifying both the Spanish localized video track and an English original audio track. Because the manifest file would not allow the user to access the Polish dubbed audio stream set preferred by the user, the quality of the viewing experience for the user would most likely be reduced.

As the foregoing illustrates, what is needed in the art are more effective techniques for tailoring media viewing experiences based on user preferences.

SUMMARY

One embodiment sets forth a computer-implemented method for generating presentations of media titles for playback. The method includes selecting a first set of video streams from multiple sets of video streams based on a first preference associated with a first user, where the multiple sets of video streams are associated with a media title and are included in a media package; selecting a first set of audio streams from multiple of sets of audio streams included in the media package based on a second preference associated with the first user; generating a first recommended presentation based on the first set of video streams and the first set of audio streams; and generating a manifest file that allows the media title to be played back in accordance with at least the first recommended presentation.

At least one technical advantage of the disclosed techniques relative to the prior art is that, with the disclosed techniques, source files are not redundantly processed by the media processing pipeline when generating and deploying a single inclusive media package that more comprehensively represents a media title to a content delivery network relative to conventional video-specific packages. Therefore, the amounts of storage resources, processing resources, and time consumed in generating and deploying a media title can be substantially reduced relative to prior art approaches. Another technical advantage of the disclosed techniques is that, unlike prior art approaches, the tracks specified in a manifest file generated using a single inclusive media package can be selected on-the-fly from all stream sets derived from all source files associated with a corresponding media title based on the preferences of a given user. Therefore, the disclosed techniques are able to generate tracks for playback that more closely align with the preferences of users relative to what can be achieved using prior art approaches where manifest files are generated based on a subset of streams included in a single video-specific package. These technical advantages provide one or more technological advancements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

FIG. 2 is a more detailed illustration of the inclusive media package of FIG. 1, according to various embodiments;

FIG. 3 is a more detailed illustration of the manifest file of FIG. 1, according to various embodiments;

FIG. 4 is a more detailed illustration of the alternate manifest file of FIG. 1, according to various embodiments;

DETAILED DESCRIPTION

Figure 1:
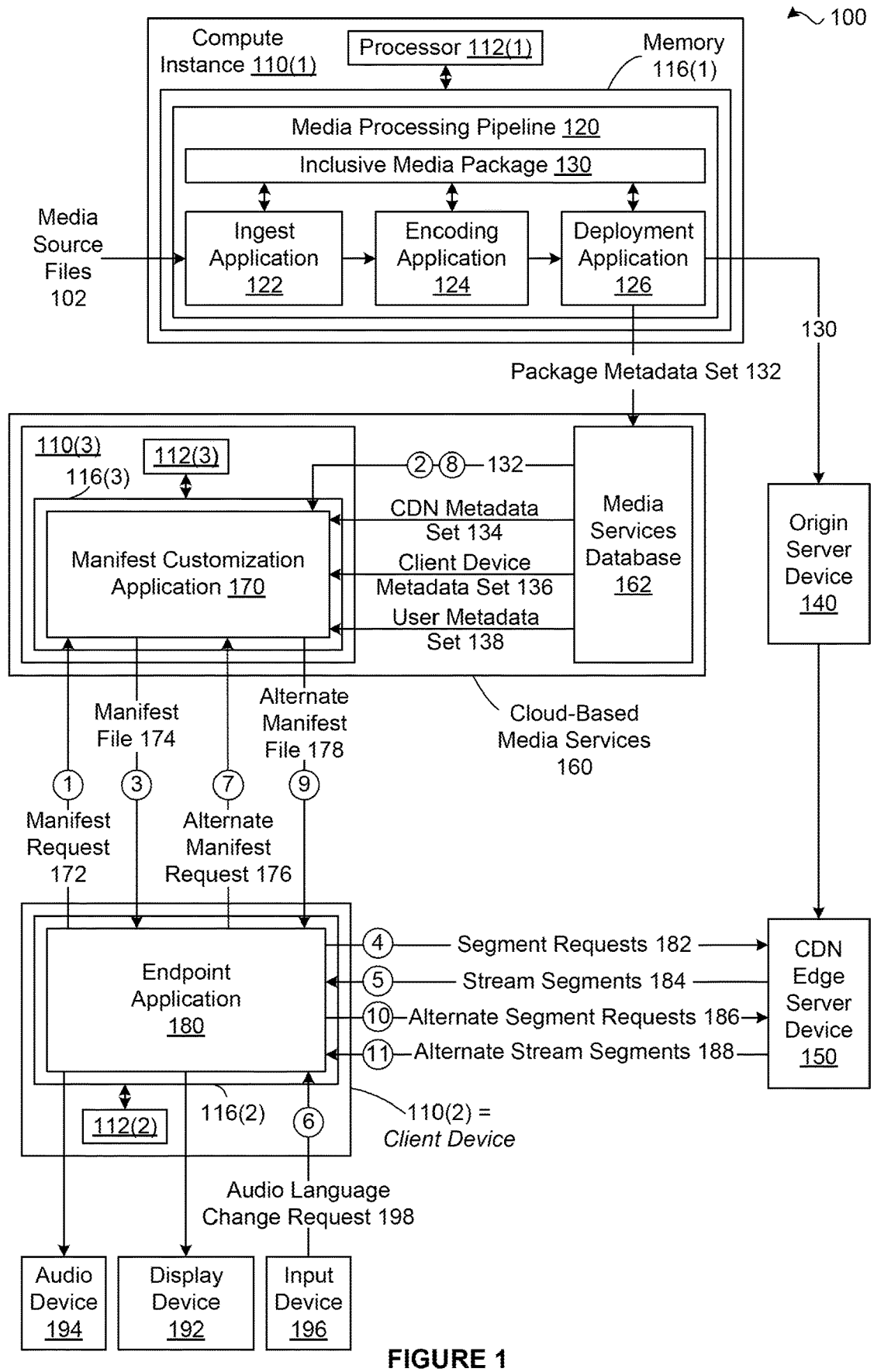
FIG. 1 is a conceptual illustration of a system configured to implement one or more aspects of the various embodiments.

In the following description, numerous specific details are set forth to provide a more thorough understanding of the various embodiments. However, it will be apparent to one of skilled in the art that the inventive concepts may be practiced without one or more of these specific details.

In video localization, an original video source file is modified to generate one or more localized video source files that conform more to corresponding target audiences. For example, lip reanimation techniques can be used to modify the lip movements of speakers in a movie produced in English to align with dubbing for the movie in thirty languages to generate thirty localized versions of the movie. To enable client devices to stream and playback a media title, a typical media streaming service independently generates and distributes a different video-specific package each different video source file associated with the media title.

To generate a video-specific package for a given video source file that is associated with a given media title, a subset of the audio source files associated with the media title, and a subset of the timed text source files associated with the media title are selected based on target audiences and compatibility with the video source file. A set of video streams is generated based on the video source file, a different set of audio streams is generated for each selected audio source file, and a different set of timed text streams is generated for each selected timed text source file. The set of video streams, the set(s) of audio streams, and the set(s) of timed text streams are grouped into a video-specific package. The video-specific package is deployed to a content delivery network that provides streams to client devices on-demand.

To playback the media title, an endpoint application executing on a client device requests a manifest file for the media title from cloud-based media services. The cloud-based media services then select a video-specific package for the media title based on one or more characteristics associated with the user (e.g., a profile language). The cloud-based media services generate one or more recommended presentations based on the selected video-specific package. Each recommended presentation includes the same video track that specifies a subset of the video stream set and a different combination of an audio track that specifies a subset of an audio stream set and an optional timed text track that specifies a subset of a timed text stream set. The cloud-based media services generate and transmit a manifest file to the endpoint application, where the manifest file enables the endpoint application to stream from the content delivery network and playback the media title in accordance with any of the recommended presentations.

One drawback of the above approach is that each audio source file and each timed text source file used to generate more than one video-specific package ends up being redundantly processed by the media processing pipeline. As a result, unnecessary amounts of storage resources, processing resources, and time are consumed in generating and deploying the different video-specific packages to the CDN. Another drawback of the above approach is that the recommended presentations specified in a given manifest file are limited to combinations of a single video track and other tracks derived from the stream sets that are actually included in the selected single-video package. If the preferences of a user are more aligned with a stream set that is omitted from the selected single-video package, then the quality of the viewing experience for the user is likely to be subpar.

For example, suppose that each of twenty video-specific packages was generated based on a different video source file, three audio source files selected from a total of twenty different audio source files, and nine timed text source files selected from a total of sixty different timed text source files. Unnecessary amounts of storage resources, processing resources, and time would be consumed in generating and deploying forty redundant audio stream sets and one hundred and twenty redundant timed text stream sets. Furthermore, if the preferences of a user were more aligned with one of the seventeen different audio stream sets and/or one or the fifty-one different timed text stream sets that are omitted from the selected single-video package, then the quality of the viewing experience for the user is likely to be degraded.

With the disclosed techniques, however, a media processing pipeline generates a single, inclusive media package for a media title based on all video source files, all audio source files, and all timed text source files associated with the media title. The inclusive media package includes all video stream sets, all audio stream sets, and all timed text stream sets derived from all source files associated with the media title. The media processing pipeline also generates metadata that describes relevant characteristics of, distinguishes between, and defines compatibility between the associated stream sets. The media processing pipeline deploys the inclusive media package to a content delivery network that provides streams to client devices on-demand. The media processing pipeline stores the metadata associated with the inclusive media package in cloud-based memory that is available to a manifest customization application that is included in cloud-based media services.

Upon receiving a request for a manifest file from an endpoint application, the manifest customization application uses the metadata associated with the inclusive media package to select one of the video stream sets in the inclusive media package based on preferences of an associated user. The manifest customization application generates one or more recommended presentations based on a video track derived from the selected video stream and preferences of the user. Each recommended presentation specifies the same video track and a different combination of an audio track and an optional timed text track. The manifest customization application generates a manifest file that describes each recommended presentation, the video track, each audio track that is included in at least one recommended presentation, and each timed text track that is included in at least one recommended presentation and identifies one or more alternate video tracks that can be made available. Each alternate video track is associated with a different unselected video track. The manifest customization application transmits the manifest file to the endpoint application.

The manifest file enables the endpoint application to playback any portion of the media title in accordance with any recommended presentation or any other combination of the tracks specified in the manifest file. Furthermore, the manifest file enables the endpoint application to select one of the alternate video tracks specified in the manifest file based on preferences of the user. Prior to or while playing back the media title, the endpoint application can transmit a request for an alternate manifest file based on the selected alternate video track to the manifest customization application. In response to a request for an alternate manifest file based on a specified alternate video track, the manifest customization application generates an alternate manifest file that describes one or more recommended presentations that each include the alternate video track, the alternate video track, each audio track that is included in at least one recommended presentation, and each timed text track that is included in at least one recommended presentation and identifies zero or more other video tracks that can be made available. The manifest customization application transmits the alternate manifest file to the endpoint application. Upon receiving the alternate manifest file, the endpoint application can switch to the selected alternate video track while continuing to playback the media title.

At least one technical advantage of the disclosed techniques relative to the prior art is that, with the disclosed techniques, the media processing pipeline does not redundantly process source files when generating and deploying a single inclusive media package to a content delivery network. Therefore, the amounts of storage resources, processing resources, and time consumed in generating and deploying a media title can be substantially reduced relative to generating and deploying multiple conventional video-specific packages. Another technical advantage of the disclosed techniques is that, unlike prior art approaches, the manifest customization application selects stream sets on-the-fly from all stream sets derived from all source files associated with a corresponding media title based on the preferences of a given user to generate tracks for inclusion in a manifest file. Therefore, the disclosed techniques are able to generate tracks for playback that more closely align with the preferences of users relative to what can be achieved using prior art approaches where manifest files are generated based on a subset of streams included in a single video-specific package. These technical advantages provide one or more technological advancements over prior art approaches.

System Overview

FIG. 1 is a conceptual illustration of a system 100 configured to implement one or more aspects of the various embodiments. As shown, in some embodiments, the system 100 includes, without limitation, a compute instance 110(1), a compute instance 110(2), a display device 192, an audio device 194, an input device 196, an origin server device 140, a content delivery network (CDN) edge server device 150, and cloud-based media services 160. For explanatory purposes, the compute instance 110(1), the compute instance 110(2), and a compute instance 110(3) included in the cloud-based media services 160 are are also referred to herein individually as "the compute instance 110" and collectively as "the compute instances 110."

In some other embodiments, the system 100 can omit one or more of the compute instances 110, the origin server device 140, the CDN edge server device 150, the cloud-based media services 160, the input device 196, or any combination thereof. In the same or other embodiments, the system 100 can further include, without limitation, one or more other compute instances, any number of other display devices, any number of other audio devices, any number and/or types of other cloud-based services, any number of other CDN edge server devices, or any combination thereof.

The components of the system 100 can be distributed across any number of shared geographic locations and/or any number of different geographic locations and/or implemented in one or more cloud computing environments (i.e., encapsulated shared resources, software, data, etc.) in any combination.

As shown, the compute instance 110(1) includes, without limitation, a processor 112(1) and a memory 116(1), the compute instance 110(2) includes, without limitation, a processor 112(2) and a memory 116(2), and the compute instance 110(3) includes, without limitation, a processor 112(3) and a memory 116(3). For explanatory purposes, the processor 112(1)—the processor 112(3) are also referred to herein individually as "the processor 112" and collectively as "the processors 112." The memory 116(1)—memory 116(4) are also referred to herein individually as "the memory 116" and collectively as "the memories 116." Each compute instance (including the compute instances 110) can be implemented in a cloud computing environment, implemented as part of any other distributed computing environment, or implemented in a stand-alone fashion.

The processor 112 can be any instruction execution system, apparatus, or device capable of executing instructions. For example, the processor 112 could comprise a central processing unit, a graphics processing unit, a controller, a micro-controller, a state machine, or any combination thereof. The memory 116 of the compute instance 110 stores content, such as software applications and data, for use by the processor 112 of the compute instance 110. The memory 116 can be one or more of a readily available memory, such as random-access memory, read only memory, floppy disk, hard disk, or any other form of digital storage, local or remote.

In some other embodiments, any number of compute instances can include any number of processors and any number of memories in any combination. In particular, any number of compute instances (including zero or more of the compute instances 110) can provide a multiprocessing environment in any technically feasible fashion.

In some embodiments, a storage (not shown) may supplement or replace the memory 116 of the compute instance 110. The storage may include any number and type of external memories that are accessible to the processor 112 of the compute instance 110. For example, and without limitation, the storage can include a Secure Digital Card, an external Flash memory, a portable compact disc read-only memory, an optical storage device, a magnetic storage device, or any suitable combination of the foregoing.

As depicted in italics, in some embodiments, the compute instance 110(2) is a client device. Some examples of client devices include, without limitation, desktop computers, laptops, smartphones, smart televisions, game consoles, tablets, etc. The compute instance 110(2) can stream media titles via a network connection (not shown) to the CDN edge server device 150. The compute instance 110(0) can playback the media title via the display device 192 and the audio device 194, and receive input from one or more associated user(s) in any technically feasible fashion. The audio device 194 can be any type of device (e.g., a speaker) that can be configured to generate sound based on any amount and/or type of audio data in any technically feasible fashion. The input device 196 can be any type of device that can be configured to receive user input in any technically feasible fashion. Some examples of input devices are a keyboard, a mouse, and a microphone that can be configured to receive user input in any technically feasible fashion.

In some other embodiments, the display device 192, the audio device 194, the input device 196, or any combination thereof can be replaced with any number and/or types of output devices, any number and/or types of input devices, any number and/or types of input/output devices, or any combination thereof. In the same or other embodiments, the compute instance 110(2), any number of other compute instances, the display device 192, the audio device 194, any number and/or types of other output devices, the input device 196, any number and/or types of input devices, any number and/or types of input/output devices, or any combination thereof are integrated into a client device.

In some embodiments, the system 100 includes multiple client devices (including the compute instance 110(2)) that can each access a library of media titles provided by a media streaming service. The origin server device 140, any number of other origin server devices, a CDN (not shown) that includes the CDN edge server device 150, and the cloud-based media services 160 are included in a delivery infrastructure for the media streaming service The origin server device 140 and zero or more other origin server devices (not shown) collectively store at least one copy of each of any number of streams for each media title in a library of media titles for streaming to client devices via one or more content delivery networks (not explicitly shown). As referred to herein, a "stream" constitutes an encoded version of a source file. In particular, a video stream constitutes an encoded version of a video source file, an audio stream constitutes an encoded version of an audio file, and a timed text stream constitutes an encoded version of a timed text file. Each video stream, audio stream, and timed text stream associated with a given media title includes, without limitation, a sequence of one or more discrete segments that correspond (in a playback timeline) to a sequence of one or more discrete segments of a baseline video source file for the media title. In some embodiments, the baseline video source file for the media title is an original video source file for the media title.

As used herein, a "video source file" for a media title includes any amount and/or types of primary video content for a media title. Some examples of types of video source files are original and localized. A localized video source file for a media title is a version of the original source file for the media title that has been modified to conform more to the individual preferences of an associated target audience. For example, text that appears in an original video source file can be replaced with comparable text in another language to generate a localized video source file. In another example, one or more scenes in an original video source file can be replaced with scenes that are more suitable for a different target audience to generate a localized video source file. For example, a hockey scene could be replaced with a soccer scene.

As used herein an "audio source file" for a media title includes any amount and/or types of primary audio content for the media title. Some examples of types of audio source files are original, dubbed, and description. An original audio source file for a media title provides an original soundtrack for the media title. A dubbed audio source file for a media title provides a translated soundtrack for the media title. An audio description source file provides either the original soundtrack or a translated soundtrack for the media title and narration that verbally describes what is happening on screen (e.g., physical actions, facial expressions, costumes, settings, scene changes).

As used herein "timed text" refers to text content and associated playback timing data that enables the text content to be presented synchronously with other media content, such as video content and/or audio content. Some examples of types of timed text are closed captions, subtitles, and forced narratives. A subtitle source file provides a transcription or translation of the spoken dialogue of a media title. A closed caption source file provides a transcription or translation of the spoken dialogue of a media title and describes relevant non-verbal sounds as well as various audio cues (e.g., speaker identification). A forced narrative source file provides text overlays that clarifies communications or alternate languages meant to be understood by a viewer (e.g., a user). Forced narratives are also commonly referred to as "forced narrative subtitles" and forced "subtitles."

Upon receiving a request for a stream segment from a client device (e.g., the compute instance 110(2)), the CDN edge server device 150 locates and transmits the nearest copy of the requested stream segment to the client device. More specifically, if the CDN edge server device 150 has a copy of the requested stream segment stored in the associated cache memory, then a "cache hit" occurs and the CDN edge server device 150 transmits the copy of the requested stream segment. If the requested stream segment is not stored in the associated cache memory, then, a "cache miss" occurs. When a cache miss occurs, the CDN edge server device 150 retrieves the requested stream segment from an intermediate cache memory included in the CDN, the origin server device 140, or another origin server device before transmitting The requested stream segment to the client device.

The cloud-based media services 160 includes, without limitation, any number and/or types of microservices, databases, and storage for activities and content associated with a streaming media service that are allocated to none of the origin server device(s), the CDN(s), and the client devices. Some examples of functionality that the cloud-based media services 160 can provide include, without limitation, login and billing, logging, personalized media title recommendations, video transcoding, server and network connection health monitoring, and client-specific CDN guidance.

In general, each compute instance (including each compute instance 110) is configured to implement one or more software applications. For explanatory purposes only, each software application is described as residing in the memory 116 of a single compute instance and executing on the processor 112 of the same compute instance. However, in some embodiments, the functionality of each software application can be distributed across any number of other software applications that reside in the memories of any number of compute instances and execute on the processors of any number of compute instances in any combination. Further, the functionality of any number of software applications can be consolidated into a single software application.

In particular, the compute instance 110(1) is configured to encode media source files associated with a media title to generate streams and then deploy the streams to a CDN. The media source files include, without limitation, an original video source file, zero or more localized video files, an original audio source file, any number other audio source files, and zero or more timed text source files, and any number and/or types of other media source files (e.g., a trick play source file).

As described in greater detail previously herein, in a conventional approach to generating and deploying streams to a CDN, a different single-video package is independently generated for each video source file. To generate a video-specific package for a given video source file, one or more audio source file(s), and zero or more of any number of other types of media source files are selected based on compatibility with the video source file and target audience(s) associated with the video-specific package. The video source file and each selected source file are encoded to generate a different set of streams or "stream set" that includes at least one corresponding stream. The media processing pipeline then generates the video-specific package that includes each of the stream sets, stores the video-specific package in an original server device, and then deploys the video-specific package from the origin server device to a CDN.

To playback the media title, a conventional endpoint application executing on a client device requests a manifest file for the media title from conventional cloud-based media services. In response to the manifest file request, a conventional manifest application selects an edge server in the CDN and a video-specific package. The conventional manifest application generates one or more recommended presentations based on the video-specific package. Each recommended presentation specifies the same video track and a different combination of one or more audio tracks and zero or more other tracks that are compatible with the video track, where each track includes a subset of the streams in a different stream set included in the video-specific package. The manifest application generates and transmits a manifest file that enables the client device to determine the selected edge server, select a recommended presentation, and request stream segments for the tracks in the selected recommended presentation.

One drawback of the above approach is that each audio source file and each timed text source file used to generate more than one video-specific package ends up being redundantly processed by the media processing pipeline. As a result, unnecessary amounts of storage resources, processing resources, and time are consumed in generating and deploying the different video-specific packages to the CDN. Another drawback of the above approach is that the recommended presentations specified in a given manifest file are limited to combinations of a single video track and other tracks derived from the stream sets that are actually included in the selected single-video package. If the preferences of a user are more aligned with a stream set that is omitted from the selected single-video package, then the quality of the viewing experience for the user is likely to be subpar.

Generating an Inclusive Media Package for a Media Title

To address the above problems, the system 100 includes, without limitation, a media processing pipeline 120 that generates an inclusive media package 130 and a package metadata set 132 based on media source files 102 for a media title. The media source files 102 include, without limitation, any number and/or types of media source files for the media title. For explanatory purposes, the media source files 102 as described herein include an original video source file, zero or more localized video source files, zero or more other video source files, an original audio source file, zero or more other audio source files, and zero or more timed text source files, but do not include any other types of media source files (e.g., trick play source files). The inclusive media package 130 is also referred to herein as a "media package."

Although not shown in FIG. 1, the inclusive media package 130 includes, without limitation, a title metadata set that describes the media title and both a media metadata set and a stream set for each media source file associated with the media title. The media metadata sets describe relevant characteristics of, distinguish between, and define compatibility between the associated stream sets. Some examples of media metadata sets are video metadata sets, audio metadata sets, and timed text metadata sets. Each stream set includes one or more streams and a different stream metadata set for each of the streams, Some examples of stream sets are video stream sets, audio stream sets, and timed text stream sets. The stream metadata sets included in a given stream set describe relevant characteristics of and distinguish between the associated streams. An example of the inclusive media package 130 is described in greater detail below in conjunction with FIG. 2. The package metadata set 132 includes the title metadata set, the media metadata sets, and the stream metadata sets.

As shown, in some embodiments, the media processing pipeline 120 resides in the memory 116(1) of the compute instance 110(1) and executes on the processor 112 of the compute instance 110. In some other embodiments, any number of portions (including all) of the functionality described herein with respect to the media processing pipeline 120 can be distributed across any number of compute instances in any technically feasible fashion.

As shown, the media processing pipeline 120 includes, without limitation, the inclusive media package 130, an ingest application 122, an encoding application 124, and a deployment application 126. The ingest application 122 initializes the inclusive media package 130 to an empty package. The ingest application 122 then generates a title metadata set based on a baseline video source file (not shown) and adds the title metadata set to the inclusive media package 130.

The baseline video source file defines the runtime of the media title and is used to establish the segments of the media title. In some embodiments, the ingest application 122 subsequently verifies that any other video source files included in the media source files 102 conform to (e.g., have the same runtime as) the baseline video source file. In some embodiments, the ingest application 122 sets the baseline video source file to the original video source file by default.

The title metadata set can specify any amount and/or types of information that is relevant to playing back the media title. In some embodiments, the title metadata set specifies, without limitation, a title identifier (ID), a baseline video ID, a fallback video ID, a runtime, and segment definitions. The title ID, the baseline video ID, and the fallback video ID identify the media title, the baseline video source file, and a fallback video source file, respectively, in any technically feasible fashion.

The fallback video source file defines the source of a video stream set that is used to generate a manifest file when none of the video stream sets in the final version of the inclusive media package 130 is associated with one or more preferred languages for a user. As described in greater detail below, preferred language(s) for a user can be explicitly specified (e.g., via metadata) or inferred (e.g., determined based on a location). The fallback video source file and the fallback video ID are also referred to herein as a "default source file" and a "default video identifier," respectively.

The segments individually correspond to different non-overlapping periods of time and collectively span the runtime in a contiguous fashion. The ingest application 122 can generate the segment definitions in any technically feasible fashion. In some embodiments the ingest application 122 partitions the baseline source video file into shots, where each shot is captured continuously from a single camera or virtual representation of a camera (e.g., in the case of computer animated videos). The ingest application 122 then selects sequences of one or more shots based on a target segment length and defines a segment for each selected sequence.

For each video source file included in the media source files 102, the ingest application 122 generates an associated video metadata set and adds the video metadata set to the inclusive media package 130. Each video metadata set specifies a different set of values for a set of video characteristics. In some embodiments, the set of video characteristics includes a language, a video type (e.g., original, localized), and optionally any other characteristics of video content that are relevant to streaming the media title, such as an aspect ratio.

For each audio source file included in the media source files 102, the ingest application 122 generates an associated audio metadata set and adds the audio metadata set to the inclusive media package 130. Each audio metadata set specifies a different set of values for a set of audio characteristics. In some embodiments, the set of audio characteristics includes a language, an audio type, and zero or more other characteristics of audio content that are relevant to streaming the media title. Some examples of audio types are original, dubbed, and audio description.

For each timed text source file included in the media source files 102, the ingest application 122 generates an associated timed text metadata set and adds the timed text metadata set to the inclusive media package 130. Each timed text metadata set specifies a different set of values for a set of timed text characteristics. In some embodiments, the set of timed text characteristics includes a language, a timed text type, an optional timed text subtype, and zero or more other characteristics of audio content that are relevant to streaming the media title. Some examples of timed text types are subtitle, closed caption, and forced narrative. The optional timed text subtype is either full or partial. As described in greater detail below, the optional timed text subtype is used to avoid displaying duplicate text during playback of the media title.

A timed text subtype of full indicates that the corresponding timed text source file includes translations of text that is included in the video content of the media title. A timed text subtype of full therefore indicates that the associated timed text source file and the corresponding timed text streams are compatible with each video source file that is associated with a different language and the corresponding video streams. A timed text subtype of partial indicates that the corresponding timed text source file does not include translations of text that is included in the video content of the media title. A timed text subtype of partial therefore indicates that the associated timed text source file and the corresponding timed text streams are compatible with each video source file that is associated with the same language and the corresponding video streams.

The encoding application 124 generates a stream set for each of the media source files 102 and adds each of the stream sets to the inclusive media package 130. Within the inclusive media package 130, the stream set for a given media source file 102 is associated with the media metadata set for the media source file 102 in any technically feasible fashion (e.g., indexes, IDs, etc.).

Each stream set includes, without limitation, at least one stream and a different stream metadata set for each stream. As noted previously herein, a stream is an encoded version of a source file. As persons skilled in the art will recognize, the number of video streams included in a video stream set is typically substantially larger than the number of streams included in any other type of stream set. (e.g., an audio stream set). The encoding application 124 can generate a stream in any technically feasible fashion that enables each segment of the stream to be decoded independently of the other segments of the stream. Ensuring that each stream segment can be independently decoded enables endpoint applications to switch between streams at segment boundaries during playback of the media title.

In some embodiments, the encoding application 124 downscales a video source file to multiple different resolutions to generate lower-resolution video source files. The encoding application 124 then executes a shot-based encoder on the video source file and each of the lower-resolution video source files across different sets of one or more encoding profiles to generate video streams having different combinations of resolutions and bitrates. The encoding application 124 propagates any amount of the metadata included in each media metadata set to each stream in the associated stream set.

The stream metadata sets included in a given stream set describe relevant characteristics of, and distinguish between, the associated streams. For instance, in some embodiments, a video stream metadata set specifies a size in bytes, a bitrate, a resolution, an encoding profile, a frame rate, and a quality score for the associated stream.

The deployment application 126 adds any amount (including none) and/or types of deployment-related metadata (not shown) to the inclusive media package 130. One example of deployment-related metadata is digital rights management (DRM) metadata. The deployment application 126 extracts the package metadata set 132 from the inclusive media package 130. As described in greater detail below, the package metadata set 132 is associated with the inclusive media package 130 upon which both a manifest file 174 and an alternate manifest file 178 are based. Notably, the manifest file 174 and the alternate manifest file 178 itemize different video tracks derived from different video stream sets included in the inclusive media package 130I In some embodiments, the package metadata set 132 includes, without limitation, the title metadata set, the video metadata sets, the stream metadata sets (included in the stream sets), and any deployment-related metadata. In some other embodiments, the package metadata set 132 includes a subset of the title metadata set, subsets of the video metadata sets, subsets of the stream metadata sets, any amount of deployment-related metadata, or any combination thereof, that is relevant to generating manifest files as described in greater detail below.

As shown, the deployment application 126 stores the package metadata set 132 in a media services database 162 that is included in the cloud-based media services 160. As also shown, the deployment application 126 transmits the inclusive media package 130 to the origin server device 140. The origin server device 140 stores the inclusive media package 130 in a memory associated with the origin server device 140. Any number and/or types of software applications executing on any number and/or types of server devices included in a CDN can transmit a request for the inclusive media package 130 to the origin server device 140 at any point-in-time. In response to each request, a software application executing on the origin server device 140 transmits the inclusive media package 130 to the requesting software application. In this fashion, the deployment application 126 distributes streams for playback of the media title via the inclusive media package 130.

In particular, a software application executing on the CDN edge server device 150 transmits a request for the inclusive media package 130 to the origin server device 140 either directly or indirectly via any number of intermediate server devices in the CDN. After receiving the inclusive media package 130, the software application executing on the CDN edge server device 150 stores the inclusive media package 130 in a cache memory associated with the CDN edge server device 150. An example of the inclusive media package 130 is described in greater detail below in conjunction with FIG. 2.

As shown, the cloud-based media services 160 includes, without limitation, the media services database 162 and the compute instance 110(3). Although not shown, the cloud-based media services 160 generates, maintains, and stores in the media services database 162 a CDN metadata set 134, a different client device metadata set for each client device, and a different user metadata set for each user associated with the streaming media service, To generate and maintain the CDN metadata set 134, the cloud-based media services 160 monitors the health of the CDN edge server device 150 and any number of other CDN edge server devices in any number of CDNs, the compute instance 110(2), any number of other client devices, and associated network connections. The CDN metadata set 134 specifies any amount and/or types of characteristics of the CDN edge server devices and network connections. In some embodiments, the CDN metadata set 134 specifies, without limitation, a routing distance, throughout, and latency for any number of connections among CDN edge server devices and client devices.

Each client device metadata set specifies any number and/of types of characteristics of an associated client device. For instance, in some embodiments, each client device metadata set specifies, without limitation, a location and a display resolution of an associate client device. Each user metadata set specifies any number and/or types of characteristics and preferences of an associated user. In some embodiments, each user metadata set specifies, without limitation, a profile language, an audio preference, and a timed text preference. A profile language for a user specifies the language of user interfaces that the streaming media provider uses to interact with the user. An audio preference specifies a language and optionally an audio type. A timed text preference specifies a language and a timed text type.

Advantageously, the media processing pipeline 120 does not redundantly process any of the media source files 102 when generating and deploying the inclusive media package 130. Therefore, the amounts of storage resources, processing resources, and time consumed in generating and deploying the media title can be substantially reduced relative to prior art techniques that represent the media title using multiple video-specific packages. And, as described in greater detail below, the inclusive media package 130 and the package metadata set 132 allow a manifest customization application 170 to generate recommended presentations of the media title and associated tracks for playback that more closely align with the preferences of users relative to what can be achieved using multiple video-specific packages In that regard, the inclusive media package 130 includes at least one encoded version (i.e., stream) of each of the media source files 102. Consequently, the manifest customization application 170 can generate the tracks for inclusion in a manifest file on-the-fly from all video stream sets, audio stream sets, and optional timed text stream sets derived from all of the media source files 102 based on the package metadata set 132 and any amount and/or type of other relevant metadata, such as the preferences of a given user.

Generating Manifest Files Based on Inclusive Media Packages

As shown, the manifest customization application 170 resides in the memory 116(23) of the compute instance 110(3) and executes on the processor 112(23) of the compute instance 110(3). The manifest customization application 170 generates manifest files that are individually tailored to different users in response to manifest requests received from client devices. Each manifest request identifies a user and a media title.

For explanatory purposes, the functionality of the manifest customization application 170 is described herein in the context of a sequence of events that are denoted by circles numbers 1-11. Also for explanatory purposes, the inclusive media package 130 as described herein includes video, audio, and timed text stream sets but does not include any other types of stream sets (e.g., trick play stream sets).

As depicted with a circle numbered 1, the manifest customization application 170 receives a manifest request 172 from an endpoint application 180. The endpoint application 180 resides in the memory 116(3) of the compute instance 110(2) (a client device) and executes on the processor 112(3) of the compute instance 110(2). The manifest request 172 identifies the compute instance 110(2), a user, and the media title associated with the media source files 102.

In response to the manifest request 172, the manifest customization application 170 retrieves the package metadata set 132, the CDN metadata set 134, a client device metadata set 136, and a user metadata set 138 from the media services database 162 (depicted with the circle numbered 2). The client device metadata set 136 and the user metadata set 138 are associated with the compute instance 110(2) and the user of the compute instance 110(2), respectively.

The manifest customization application 170 designates each of the CDN edge server device 150 and optionally one or more other CDN edge server devices as a "recommended" CDN edge server device based on the CDN metadata set 134 and the client device metadata set 136. Typically, the manifest customization application 170 designates at least one CDN edge server device that is proximate to the client device as a recommended server device.

The manifest customization application 170 selects one of the video stream sets that are included in the inclusive media package 130 based on the package metadata set 132, the user metadata set 138, and optionally the client device metadata set 136. In some embodiments, the manifest customization application 170 determines whether the language specified in any of the video metadata sets in the package metadata set 132 matches a preferred language and/or a preferred aspect ratio specified in the user metadata set 138 and/or the client device metadata set 136. If the manifest customization application 170 finds a matching video stream set and determines that rights to access the matching video stream set are not restricted for the location associated with the client device, then the manifest customization application 170 selects the matching video stream set. Otherwise, the manifest customization application 170 selects the video stream set associated with the default video identifier specified in the title metadata set included in the package metadata set 132.

If an audio preference is specified in the user metadata set 138, then the manifest customization application 170 determines whether one of the audio stream sets that are included in the inclusive media package 130 matches the audio preference based on the audio metadata sets in the package metadata set 132. If the manifest customization application 170 finds a matching audio stream set, then the manifest customization application 170 selects the matching audio stream set. Otherwise, the manifest customization application 170 executes any number and/or types of heuristics to select an audio stream set based on the user metadata set 138, the package metadata set 132, optionally the client device metadata set 136, and optionally the selected video stream set.

If a timed text preference is specified in the user metadata set 138, then the manifest customization application 170 determines whether any of the timed text stream sets included in the inclusive media package 130 matches the timed text preference based on the timed text metadata sets in the package metadata set 132. If the manifest customization application 170 finds a single matching timed text stream set, then the manifest customization application 170 selects the matching timed text stream set.

If, however, the manifest customization application 170 finds two different matching timed text stream sets, then the manifest customization application 170 selects one of the matching timed text streams based on compatibility with the selected video stream set. In some embodiments, if the language specified in the timed text preference matches the language associated with the selected video stream set, then the manifest customization application 170 selects the matching timed text stream that is associated with the timed text subtype of partial. Otherwise, the manifest customization application 170 selects the matching timed text stream that is associated with the timed text subtype of full.

If the manifest customization application 170 does not find any matching timed text stream sets, then the manifest customization application 170 executes any number and/or types of heuristics to select a timed text stream set based on the user metadata set 138, the package metadata set 132, optionally the client device metadata set 136, and optionally the selected video stream set.

The manifest customization application 170 selects at least one video stream from the video streams included in the selected video stream set for inclusion in a video track. Accordingly, the video track is a subset of the video streams included in the selected video stream set. As used herein a "subset" can be a proper subset or an improper subset. The manifest customization application 170 selects at least one audio stream from the audio streams included in the selected audio stream set for inclusion in an audio track. Accordingly, the audio track is a subset of the audio streams included in the selected audio stream set. If a timed text stream set is selected, then the manifest customization application 170 selects at least one timed text stream from the timed text streams included in the selected timed text stream set for inclusion in a timed text track. The manifest customization application 170 can select the one or more streams that are included in a track in any technically feasible fashion.

In some embodiments the manifest customization application 170 selects at least one stream from the streams included in the selected stream set for inclusion in an track based the corresponding stream metadata sets, the associated media metadata sets, the client device metadata set 136, the CDN metadata set 134, the user metadata set 138, any amount and/or types of other data, any number of selection criteria, or any combination thereof. Some examples of selection criteria that the manifest customization application 170 can use to select the streams that are included in a track are network throughput, bitrates of streams, user preferences, compatibility with the client device, rights restrictions associated with the location of the client device, and rights restrictions associated with the user.

If the manifest customization application 170 selects at least one timed text stream for inclusion in a timed text track, then the manifest customization application 170 also groups the video track, the audio track, and the timed text track to generate a recommended presentation. Otherwise, the manifest customization application 170 groups the video track and the audio track to generate a recommended presentation.

The manifest customization application 170 defines zero or more other recommended presentations that each specify the video track and a different combination of an audio track and an optional timed text track. The manifest customization application 170 can define recommended presentations and any number of other audio tracks and/or other timed text tracks specified in the recommended presentations based on any number and/or types of heuristics and any number and/or types of criteria in any technically feasible fashion.

The manifest customization application 170 generates a video track description for the video track, a different audio track description for each audio track, and a different timed text track description for each timed text track. Video tracks, audio tracks, and timed text tracks are also referred to herein as "tracks." Each track description specifies a track identifier, a subset of the associated media metadata set, the stream(s) included in the corresponding track, a subset of the stream metadata set for each stream, and one or more locator(s) for each stream.

The locator(s) for a stream are references that can be used in conjunction with any amount (including none) of other data in a manifest file to request individual segments of the stream from the recommended server device. In some embodiments, a track description could specify a different universal record locator (URL) for each segment of each stream in a corresponding track. In some other embodiments, a track description could specify a base universal record locator (URL) associated with a first segment of a first stream in a corresponding track and segment offsets for each of the other stream segments in a corresponding track.

Notably, the manifest customization application 170 can generate, for inclusion in a manifest file, a different alternate video track summary for each of zero or more "alternate" video tracks. Each alternate video track summary indicates that the associated alternate video track can be made available. More precisely, each alternate video track summary identifies a different alternate video track that can be derived from a different unselected video stream set included in the inclusive media package 130, specifies at least a subset of the associated video metadata set, and optionally specifies any amount and/or types of other relevant metadata. For instance, in some embodiments, each alternate video track summary specifies metadata that includes an alternate video track identifier, a language, a video type, and optionally an aspect ratio. In the same or other embodiments, the alternate video track identifier embeds an identifier for the corresponding video stream set.

The manifest customization application 170 generates a manifest file 174 that specifies, without limitation, each recommended server device, a title description set, each recommended presentation, each track description, and each alternate video track summary. The title description set identifies the media title and specifies any amount and/or types of metadata that is relevant to the playback of the media title. In some embodiments, the title description set is at least a subset of the title metadata set that is included in the inclusive media package 130. An example of the manifest file 174 is described in greater detail below in conjunction with FIG. 3.

As depicted with the circle numbered 3, the manifest customization application 170 transmits the manifest file 174 to the endpoint application 180, thereby fulfilling the manifest request 172. As described in greater detail below, the manifest file enables the endpoint application 180 to playback the media title via any of the recommended presentations.

To playback the media title, the endpoint application 180 selects the tracks specified in one of the recommended presentations. For each segment of the media title, the endpoint application 180 selects a corresponding segment from one stream in each selected track. As depicted with the circle numbered 4, the endpoint application 180 transmits segment requests 182 for the selected stream segments to the CDN edge server device 150. In response, the CDN edge server device 150 transmits stream segments 184 to the endpoint application 180 (depicted with the circle numbered 5). The endpoint application 180 decodes each stream segment to generate decoded media content and plays back the media content.

Advantageously, playing back a media title via a recommended presentation automatically tailors (e.g., personalizes) the media viewing experience for the user based, at least in part, on user preferences specified in the user metadata set 138. And, as described below, each alternate video track description in the manifest file 174 can provide the endpoint application 180 with an opportunity to perform video track switching to further align the media viewing experience with user preferences during playback of the media title.

For instance, in some embodiments, the endpoint application 180 enables a user, via a graphical user interface, to select any of the alternate video track(s) based on the language(s) and/or aspect ratio(s) specified in the corresponding alternate video track summary. In some other embodiments, including the embodiment depicted in FIG. 1, the endpoint application 180 automatically selects an alternate video track based on any type of user information.

As depicted with the circle numbered 6, during the playback of the media title, the endpoint application 180 receives an audio language change request 198 from the user via the input device 196. In response, the endpoint application 180 determines that the language associated with one of the alternate video tracks matches the newly requested audio language. As depicted with the circle numbered 7, and while continuing to playback the media title, the endpoint application 180 transmits an alternate manifest request 176 to the manifest customization application 170. The alternate manifest request 176 identifies the client device, the user, the media title, and the alternate video track that matches the requested audio language.

Generating Alternate Manifest Files for Video Track Switching

The manifest customization application 170 generates alternate manifest files that are individually tailored to different users in response to alternate manifest requests received from client devices. Each alternate manifest request identifies a user, a media title, and a requested alternate video track. As used herein, an "alternate manifest file" refers to a manifest file for a media title that is generated based on a request for a manifest file that itemizes an alternate video track. In some embodiments, the alternate manifest request 176 is a request for a manifest file that identifies an alternate video track and/or a video stream set from which an alternate video track is to be derived.

In response to the alternate manifest request 176, the manifest customization application 170 re-retrieves the package metadata set 132, the CDN metadata set 134, the client device metadata set 136, and the user metadata set 138 from the media services database 162 (depicted with the circle numbered 8). The manifest customization application 170 selects a video stream set from the video stream sets included in the inclusive media package 130 based on the package metadata set 132 and metadata that is associated with the requested alternate video track and specified in the alternate manifest request 176. The manifest customization application 170 selects one or more video streams from the video streams included in the selected video stream set for inclusion in the alternate video track.

In some embodiments, the manifest customization application 170 preferentially selects an audio stream set from the audio stream sets included in the inclusive media package 130 based on associated metadata specified in the package metadata set 132 and a language that is associated with the alternate video track. The manifest customization application 170 selects one or more audio streams from the audio streams included in the selected audio stream set for inclusion in an audio track.

In some embodiments, the manifest customization application 170 optionally selects one or more timed text streams from inclusive media package 130 for inclusion in an optional timed text track using techniques similar to the techniques described previously herein in conjunction with generating the manifest file 174. If the manifest customization application 170 selects at least one timed text stream for inclusion in a timed text track, then the manifest customization application 170 also groups the alternate video track, the audio track, and the timed text track to generate a recommended presentation. Otherwise, the manifest customization application 170 groups the alternate video track and the audio track to generate a recommended presentation.

The manifest customization application 170 defines zero or more other recommended presentations that each specify the alternate video track and a different combination of an audio track and an optional timed text track. The manifest customization application 170 generates a video track description for the alternate video track, a different audio track description for each audio track, and a different timed text track description for each timed text track. Optionally, the manifest customization application 170 can generate any number of different alternate video track summaries for inclusion in the alternate manifest file 174.

The manifest customization application 170 generates an alternate manifest file 178 that specifies, without limitation, one or more recommended server devices, the title description set, the one or more recommended presentations, the video track description for the requested alternate video track, an audio track description for each audio track included in at least one of the recommended presentations, a timed text track description for each timed text track included in at least one of the recommended presentations, and zero or more alternate video track summaries. An example of the alternate manifest file 178 is described in greater detail below in conjunction with FIG. 4.

As depicted with the circle numbered 9, the manifest customization application 170 transmits the alternate manifest file 178 to the endpoint application 180, thereby fulfilling the alternate manifest request 176. In response, the endpoint application 180 deselects the currently selected tracks and selects the tracks specified in one of the recommended presentations specified in the alternate manifest request 176.

For each segment of the media title, the endpoint application 180 selects a corresponding stream segment from one stream in each newly selected track. As depicted with the circle numbered 10, the endpoint application 180 transmits alternate segment requests 186 for the selected stream segments to the CDN edge server device 150. In response, the CDN edge server device 150 transmits alternate stream segments 188 to the endpoint application 180 (depicted with the circle numbered 11). The endpoint application 180 decodes each alternate stream segment to generate decoded media content and plays back the media content. In this fashion, the manifest customization application 170 enables video switching during the playback of the media title.

Please note that the techniques described herein are illustrative rather than restrictive and can be altered without departing from the broader spirit and scope of the embodiments. Many modifications and variations on the functionality of the media processing pipeline 120, the ingest application 122, the encoding application 124, the deployment application 126, the cloud-based media services 160, the manifest customization application 170, the endpoint application 180, the origin server device 140, the CDN, and the CDN edge server device 150 as described herein will be apparent to those of ordinary skill in the art without departing from the scope and spirit of the described embodiments.

Similarly, the storage, organization, amount, and/or types of data described herein are illustrative rather than restrictive and can be altered without departing from the broader spirit and scope of the embodiments. In that regard, many modifications and variations on the media source files 102, the inclusive media package 130, the package metadata set 132, the CDN metadata set 134, the media services database 162, the client device metadata set 136, the user metadata set 138, the manifest request 172, the manifest file 174, the alternate manifest request 176, the alternate manifest file 178, the segment requests 182, the stream segments 184, the alternate segment requests 186, the alternate stream segments 188, and the audio language change request 198 as described herein will be apparent to those of ordinary skill in the art without departing from the scope and spirit of the described embodiments.

For instance, in some embodiments, the ingest application 122 can generate video metadata sets that specify values for any number and/or types of characteristics that collectively differentiate between corresponding video stream sets and therefore different video tracks. The manifest customization application 170 can use the differentiating characteristics to select a video stream set and then generate a manifest file based on the video stream. The endpoint application 180 can use the differentiating characteristics (specified in the manifest file) to request an alternate manifest file based on one of the alternate video tracks specified in the manifest file.

In some alternate embodiments, the media source files 102 include one or more trick play source files. Each trick play source file specifies a subset of the frames of an associated video source file. For each trick play source file included in the media source files 102, the ingest application 122 generates an associated trick play metadata set and adds the trick play metadata set to the inclusive media package 130. Each trick play metadata set specifies a matching video ID, a trick play type, and zero or more other characteristics of trick plays that are relevant to streaming the media title.

The matching video ID identifies the video source file and/or the associated video metadata set that the trick play source file is intended to be used with in any technically feasible fashion. Some examples of trick play types are fast forward, skip mode, rewind, and search. For each trick play metadata set, the encoding application 124 generates a trick play stream set based on the associated trick play source file and/or the associated video source file and adds the trick play stream set to the inclusive media package 130. Each trick play stream specifies a subset of the encoded frames in a corresponding video stream. The deployment application 126 adds the trick play metadata set(s) to the package metadata set 132. The manifest customization application 170 adds zero or more trick play track descriptions to the manifest file 174 and the alternate manifest file 178. The endpoint application 180 can use one or more trick play tracks specified in a manifest file (e.g., the manifest file 174, the alternate manifest file 178) to provide visual feedback during non-normal playback modes, such as a fast forward mode, a skip mode, a rewind mode, a search mode, etc.

It will be appreciated that the system 100 shown herein is illustrative and that variations and modifications are possible. For example, the functionality provided by the ingest application 122, the encoding application 124, and the deployment application 126 as described herein can be integrated into or distributed across any number of software applications (including one), and any number of components of the system 100. Further, the connection topology between the various units in FIG. 1 can be modified as desired.

Exemplar Inclusive Media Package

FIG. 2 is a more detailed illustration of the inclusive media package 130 of FIG. 1, according to various embodiments. More specifically, the inclusive media package 130 depicted in FIG. 2 is an exemplar inclusive media package. As shown, in some embodiments, the inclusive media package 130 includes, without limitation, a title metadata set 210, a video stream set 220(1)—a video stream set 220(3), a video metadata set 230(1)—a video metadata set 230(3), an audio stream set 240(1)—an audio stream set 240(6), an audio metadata set 250(1)—an audio metadata set 250(6), a timed text stream set 260(1)—a timed text stream set 260(6), and a timed text metadata set 270(1)—a timed text metadata set 270(6).

As described previously herein in conjunction with FIG. 1, the title metadata set 210 specifies a title ID (titleID) associated with a media title, a runtime of the media title, segment definitions (segmentDefinitions) for the media title, a baseline video ID (baselineVideoID), and a fallback video ID (fallbackVideoID).

As shown, the video metadata set 230(1) specifies a language of English (en) and a video type (videoType) of original. The video metadata set 230(1) is associated with the video stream set 220(1). The video stream set 220(1) therefore specifies one or more video streams and a different stream metadata set for each of the video streams, where each of the video streams is a different encoded version of an English original video source file.

As shown, the video metadata set 230(2) specifies a language of French (fr) and a video type of localized. The video metadata set 230(2) is associated with the video stream set 220(2). The video stream set 220(2) therefore specifies one or more video streams and a different stream metadata set for each of the video streams, where each of the video streams is a different encoded version of a French localized video source file.

As shown, the video metadata set 230(3) specifies a language of Spanish (es) and a video type of localized. The video metadata set 230(3) is associated with the video stream set 220(3). The video stream set 220(3) therefore specifies one or more video streams and a different stream metadata set for each of the video streams, where each of the video streams is a different encoded version of a Spanish localized video source file.

As shown, the audio metadata set 250(1) specifies a language of English and an audio type (audioType) of original. The audio metadata set 250(1) is associated with the audio stream set 240(1). The audio stream set 240(1) therefore specifies one or more audio streams and a different stream metadata set for each of the audio streams, where each of the audio streams is a different encoded version of an English original audio source file.

As shown, the audio metadata set 250(2) specifies a language of French and an audio type of dubbed. The audio metadata set 250(2) is associated with the audio stream set 240(2). The audio stream set 240(2) therefore specifies one or more audio streams and a different stream metadata set for each of the audio streams, where each of the audio streams is a different encoded version of a French dubbed audio source file.

As shown, the audio metadata set 250(3) specifies a language of Spanish, a timed text type of subtitle, and a timed text subtype of full. The audio metadata set 250(3) is associated with the audio stream set 240(3). The audio stream set 240(3) therefore specifies one or more audio streams and a different stream metadata set for each of the audio streams, where each of the audio streams is a different encoded version of a Spanish dubbed audio source file.

As shown, the audio metadata set 250(4) specifies a language of English and an audio type of description. The audio metadata set 250(4) is associated with the audio stream set 240(4). The audio stream set 240(4) therefore specifies one or more audio streams and a different stream metadata set for each of the audio streams, where each of the audio streams is a different encoded version of an English audio description source file.

As shown, the audio metadata set 250(5) specifies a language of French and an audio type of description. The audio metadata set 250(5) is associated with the audio stream set 240(5). The audio stream set 240(5) therefore specifies one or more audio streams and a different stream metadata set for each of the audio streams, where each of the audio streams is a different encoded version of a French audio description source file.

As shown, the audio metadata set 250(6) specifies a language of Spanish and an audio type of description. The audio metadata set 250(6) is associated with the audio stream set 240(6). The audio stream set 240(6) therefore specifies one or more audio streams and a different stream metadata set for each of the audio streams, where each of the audio streams is a different encoded version of a Spanish audio description source file.

As shown, the timed text metadata set 270(1) specifies a language of English, a timed text type (timedTextType) of subtitle, and a timed text subtype (timedTextSubtype) of full. The timed text metadata set 270(1) is associated with the timed text stream set 260(1). The timed text stream set 260(1) therefore specifies one or more timed text streams and a different stream metadata set for each of the timed text streams, where each of the timed text streams is a different encoded version of an English full subtitle source file.

As shown, the timed text metadata set 270(2) specifies a language of French, a timed text type of subtitle, and a timed text subtype of full. The timed text metadata set 270(2) is associated with the timed text stream set 260(2). The timed text stream set 260(2) therefore specifies one or more timed text streams and a different stream metadata set for each of the timed text streams, where each of the timed text streams is a different encoded version of a French full subtitle source file.

As shown, the timed text metadata set 270(3) specifies a language of Spanish, a timed text type of subtitle, and a timed text subtype of full. The timed text metadata set 270(3) is associated with the timed text stream set 260(3). The timed text stream set 260(3) therefore specifies one or more timed text streams and a different stream metadata set for each of the timed text streams, where each of the timed text streams is a different encoded version of a Spanish full subtitle source file.

As shown, the timed text metadata set 270(4) specifies a language of English, a timed text type of subtitle, and a timed text subtype of partial. The timed text metadata set 270(4) is associated with the timed text stream set 260(4). The timed text stream set 260(4) therefore specifies one or more timed text streams and a different stream metadata set for each of the timed text streams, where each of the timed text streams is a different encoded version of an English partial subtitle source file.

As shown, the timed text metadata set 270(5) specifies a language of French, a timed text type of subtitle, and a timed text subtype of partial. The timed text metadata set 270(5) is associated with the timed text stream set 260(5). The timed text stream set 260(5) therefore specifies one or more timed text streams and a different stream metadata set for each of the timed text streams, where each of the timed text streams is a different encoded version of a French partial subtitle source file.

As shown, the timed text metadata set 270(6) specifies a language of Spanish, a timed text type of subtitle, and a timed text subtype of partial. The timed text metadata set 270(6) is associated with the timed text stream set 260(6). The timed text stream set 260(6) therefore specifies one or more timed text streams and a different stream metadata set for each of the timed text streams, where each of the timed text streams is a different encoded version of a Spanish partial subtitle source file.

Exemplar Manifest File

FIG. 3 is a more detailed illustration of the manifest file 174 of FIG. 1, according to various embodiments. More specifically, the manifest file 174 depicted in FIG. 3 is an exemplar manifest file. For explanatory purposes, the manifest customization application 170 generates the manifest file 174 based on the example of the inclusive media package 130 that is depicted in FIG. 2, a location of Spain, a preferred language (e.g., a profile language) of English, a preferred audio language of English, a preferred timed text language of English, and a preferred timed text type of subtitle.

As shown, the manifest file 174 specifies, without limitation, a recommended server device 310, a media title description 320, a recommended presentation 330(1)—a recommended presentation 330(6), a video track description 340, an audio track description 350(1), an audio track description 350(2), a timed text track description 360(1), a timed text track description 360(2), an alternate video track summary 370(1), and an alternate video track summary 370(2). As shown, the recommended server device 310 is the CDN edge server device 150 of FIG. 1. The media title description 320 is equal to the title metadata set 210 specified in the inclusive media package 130.

The recommended presentation 330(1) specifies an English original video track that is associated with the video track description 340, an English original audio track that is associated with the audio track description 350(1), and an English partial subtitle track that is associated with the timed text track description 360(1). The recommended presentation 330(2) specifies the English original video track, the English original audio track, and a Spanish full subtitle track that is associated with the timed text track description 360(2). The recommended presentation 330(3) specifies the English original video track and the English original audio track.

The recommended presentation 330(4) specifies the English original video track, an English audio description track that is associated with the audio track description 350(2), and the English partial subtitle track. The recommended presentation 330(5) specifies the English original video track, the English audio description track, and the Spanish full subtitle track. The recommended presentation 330(6) specifies the English original video track and the English audio description track.

The video track description 340 describes a video track that includes a subset of the video streams in the video stream set 220(1). Referring back to FIG. 2, the video stream set 220(1) is an English original video stream set. In some embodiments, the video track description 340 specifies a video track identifier, a language of English, a video type of original, the constituent video streams, and stream-specific metadata for each of the constituent video streams. The stream-specific metadata for a given constituent video stream specifies a size in bytes, a bitrate, a resolution, an encoding profile, a frame rate, a quality score, and one or more URLs that the CDN edge server device 150 can use to retrieve each segment of the video stream.

The audio track description 350(1) describes an audio track that includes a subset of the audio streams in the audio stream set 240(1). Referring back to FIG. 2, the audio stream set 240(1) is an English original audio stream set. In some embodiments, the audio track description 350(1) specifies an audio track identifier, a language of English, an audio type of original, one or more constituent audio streams, and stream-specific metadata for each of the constituent audio streams. In a similar fashion, the audio track description 350(2) describes an audio track that includes a subset of the audio streams in the audio stream set 240(4). Referring back to FIG. 2, the audio stream set 240(4) is an English audio description stream set.

The timed text track description 360(1) describes a timed text track that includes a subset of the timed text streams in the timed text stream set 260(4). Referring back to FIG. 2, the timed text stream set 260(4) is an English partial subtitle stream set. The timed text track description 360(2) describes a timed text track that includes a subset of the timed text streams in the timed text stream set 260(3). Referring back to FIG. 2, the timed text stream set 260(3) is a Spanish full subtitle stream set.

The alternate video track summary 370(1) identifies an alternate video track that can be derived from the video stream set 220(3) and specifies any amount of the video metadata set 230(3) that corresponds to the video stream set 220(3). Referring back to FIG. 2, the video stream set 220(3) is a Spanish localized video stream set. In some embodiments, the alternate video track summary 370(1) therefore specifies an alternate video track identifier that embeds an identifier for the video stream set 220(3), a language of Spanish, and a video type of localized.

The alternate video track summary 370(2) identifies an alternate video track that can be derived from the video stream set 220(2) and specifies any amount of the video metadata set 230(2) that corresponds to the video stream set 220(2). Referring back to FIG. 2, the video stream set 220(2) is a French localized video stream set. In some embodiments, the alternate video track summary 370(2) therefore specifies an alternate video track identifier that embeds an identifier for the video stream set 220(2), a language of French, and a video type of localized.

Advantageously, the alternate video track summary 370(1) and the alternate video track summary 370(2) enable the endpoint application 180 to orchestrate a video switching process. During the video switching process, the endpoint application 180 switches from playing back the media title via a recommended presentation that includes the English original video track to playing back the media title via a recommended presentation that includes either a Spanish localized video track or a French localized video track.

Exemplar Alternate Manifest File

FIG. 4 is a more detailed illustration of the alternate manifest file 178 of FIG. 1, according to various embodiments. More specifically, the alternate manifest file 178 depicted in FIG. 4 is an exemplar alternate manifest file. For explanatory purposes, the manifest customization application 170 generates the alternate manifest file 178 based on an identifier for the alternate video track summary 370(2) of FIG. 3, the inclusive media package 130 that is depicted in FIG. 2, a preferred timed text language of English, and a preferred timed text type of subtitle.

More specifically, the manifest customization application 170 selects the video stream set 220(2) based on the identifier for the alternate video track summary 370(2). The manifest customization application 170 then generates the alternate manifest file 178 based on the video stream set 220(2), the inclusive media package 130, and a timed text preference of English subtitles. Referring back to FIG. 2, the video stream set 220(2) is a French localized video stream set and therefore the manifest customization application 170 generates that alternate manifest file 178 based on a French localized video track.

As shown, the alternate manifest file 178 specifies, without limitation, a recommended server device 410, the media title description 320, a recommended presentation 430 (1)—a recommended presentation 430(6), a video track description 440, an audio track description 450(1), an audio track description 450(2), a timed text track description 460(1), a timed text track description 460(2), an alternate video track summary 470(1), and an alternate video track summary 470(2). As shown, the recommended server device 410 is the CDN edge server device 150 of FIG. 1. The media title description 320 is equal to the title metadata set 210 specified in the inclusive media package 130.

The recommended presentation 430(1) specifies a French localized video track that is associated with the video track description 440, a French dubbed audio track that is associated with the audio track description 450(1), and an English full subtitle track that is associated with the timed text track description 460(1). The recommended presentation 430(2) specifies the French localized video track, the French dubbed audio track, and a French partial subtitle track that is associated with the timed text track description 460(2). The recommended presentation 430(3) specifies the French localized video track and the French dubbed audio track.

The recommended presentation 430(4) specifies the French localized video track, an English original audio track that is associated with the video track description 440, a French audio description track that is associated with the audio track description 450(2), and the English full subtitle track. The recommended presentation 430(5) specifies the French localized video track, the French audio description track, and the French partial subtitle track. The recommended presentation 430(3) specifies the French localized video track and the French audio description track.

The video track description 440 describes a French localized video track that includes a subset of the video streams in the video stream set 220(2). In some embodiments, the video track description 440 specifies a video track identifier, a language of French, a video type of localized, the constituent video streams, and stream-specific metadata for each of the constituent video streams.

The audio track description 450(1) describes a French dubbed audio track that includes a subset of the audio streams in the audio stream set 240(2). The audio track description 450(2) describes a French audio description track that includes a subset of the audio streams in the audio stream set 240(5). The timed text track description 460(1) describes an English full subtitle track that includes a subset of the timed text streams in the timed text stream set 260(1). The timed text track description 460(2) describes a French partial subtitle track that includes a subset of the timed text streams in the timed text stream set 260(5).

The alternate video track summary 470(1) identifies an alternate English original video track that can be derived from the video stream set 220(1) and specifies any amount of the video metadata set 230(1) that corresponds to the video stream set 220(1). The alternate video track summary 470(2) identifies an alternate Spanish localized video track that can be derived from the video stream set 220(3) and specifies any amount of the video metadata set 230(3) that corresponds to the video stream set 220(3).

Techniques for Providing Streams Associated with a Media Title for Playback

Figure 5:
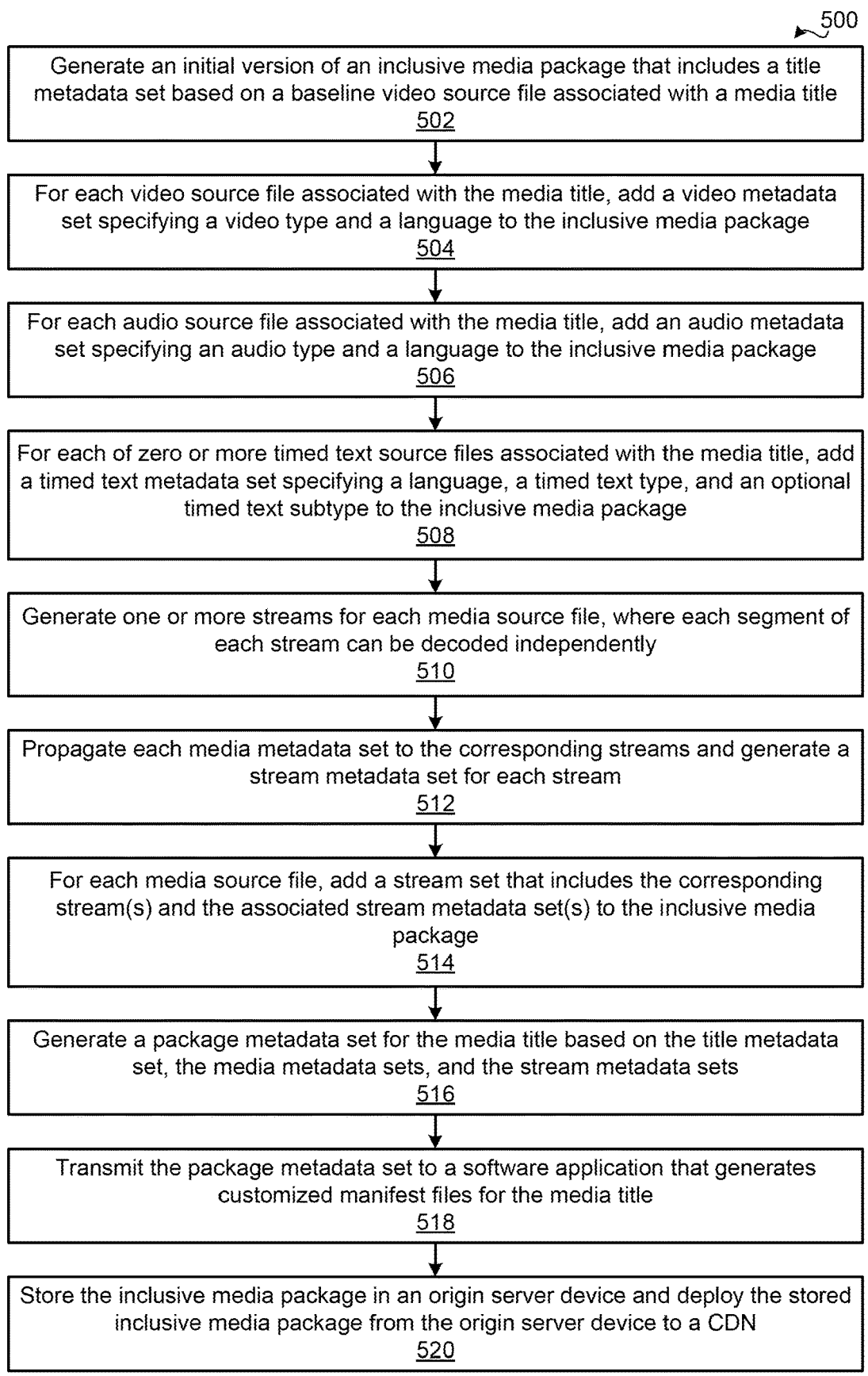
FIG. 5 is a flow diagram of method steps for generating and deploying streams that are associated with a media title to a content delivery network, according to various embodiments.

FIG. 5 is a flow diagram of method steps for generating and deploying streams that are associated with a media title to a content delivery network, according to various embodiments. Although the method steps are described with reference to the systems of FIGS. 1-4, persons skilled in the art will understand that any system configured to implement the method steps, in any order, falls within the scope of the embodiments.

As shown, a method 500 begins at step 502, where the ingest application 122 generates an initial version of an inclusive media package that includes a title metadata set based on a baseline video source file associated with a media title. At step 504, for each video source file associated with the media title, the ingest application 122 adds a video metadata set specifying a video type and a language to the inclusive media package At step 506, for each audio source file associated with the media title, the ingest application 122 adds an audio metadata set specifying an audio type and a language to the inclusive media package, At step 508, for each of zero or more timed text source files associated with the media title, the ingest application 122 adds a timed text metadata set specifying a language, a timed text type, and an optional timed text subtype to the inclusive media package.

At step 510, the encoding application 124 generates one or more streams for each media source file, where each segment of each stream can be decoded independently. At step 512, the encoding application 124 propagates each media metadata set to the corresponding streams and generates a stream metadata set for each stream. At step 514, for each media source file, the encoding application 124 adds a stream set that includes the corresponding stream(s) and the associated stream metadata set(s) to the inclusive media package.

At step 516, the deployment application 126 generates a package metadata set for the media title based on the title metadata set, the media metadata sets, and the stream metadata sets. At step 518, the deployment application 126 transmits the package metadata set to a software application that generates customized manifest files for the media title. At step 520, the deployment application 126 stores the inclusive media package in an origin server device and deploys the stored inclusive media package from the origin server device to a CDN. The method 500 then terminates.

Figure 6:
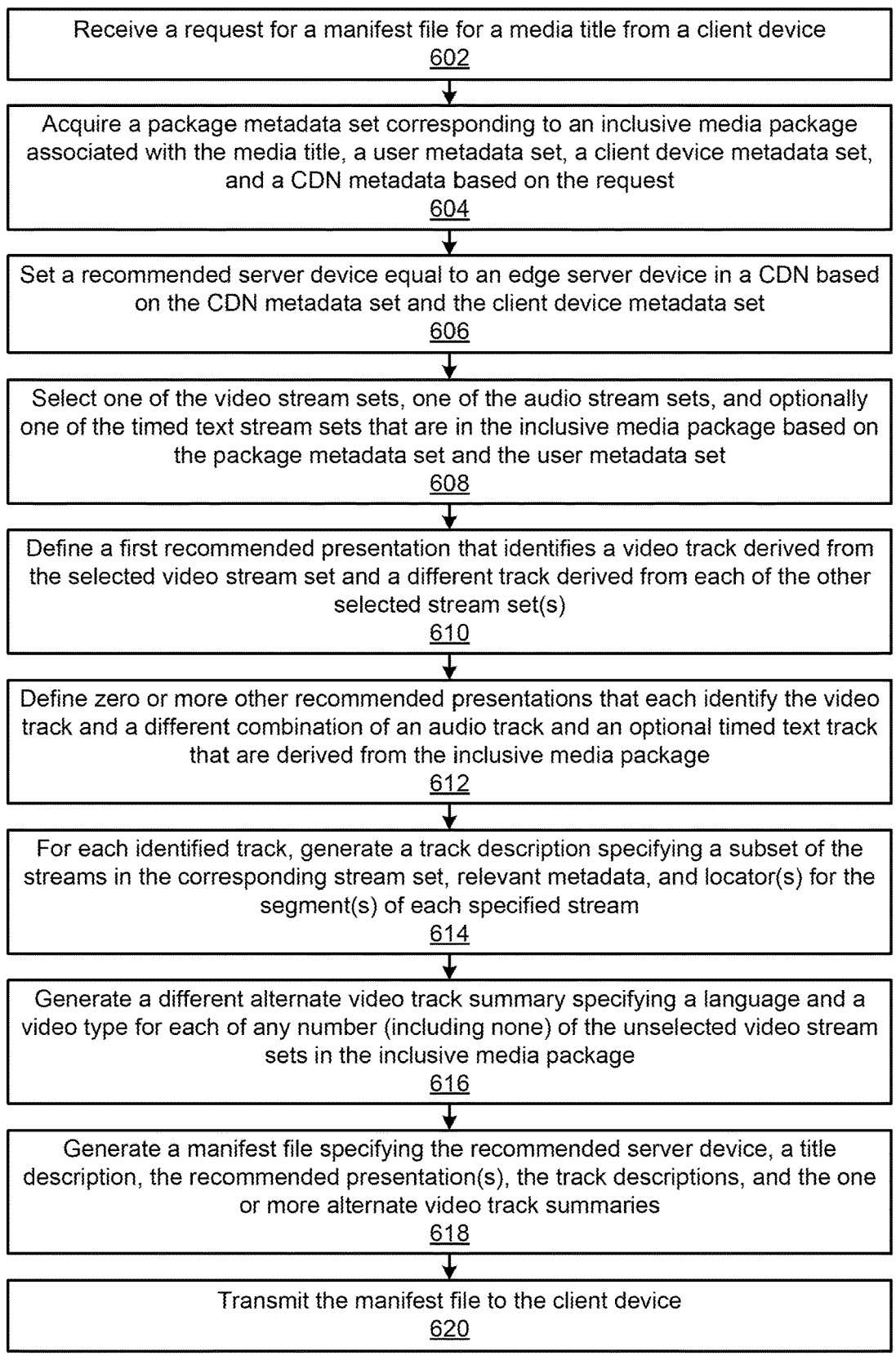
FIG. 6 is a flow diagram of method steps for generating a manifest file that itemizes streams that are associated with a media title, according to various embodiments.

FIG. 6 is a flow diagram of method steps for generating a manifest file that itemizes streams that are associated with a media title, according to various embodiments. Although the method steps are described with reference to the systems of FIGS. 1-4, persons skilled in the art will understand that any system configured to implement the method steps, in any order, falls within the scope of the embodiments.

As shown, a method 600 begins at step 602, where the manifest customization application 170 receives a request for a manifest file from a client device. At step 604, the manifest customization application 170 acquires a package metadata set corresponding to an inclusive media package associated with the media title, a user metadata set, a client device metadata set, and CDN metadata set 134 based on the request.

At step 606, the manifest customization application 170 sets a recommended server device equal to an edge server device in a CDN based on the CDN metadata set 134 and the client device metadata set. At step 608, the manifest customization application 170 selects one of the video stream sets, one of the audio stream sets, and optionally one of the timed text stream sets that are in the inclusive media package based on the package metadata set and the user metadata set. At step 610, the manifest customization application 170 defines a first recommended presentation that identifies a video track derived from the selected video stream set and a different track derived from each of the other selected stream set(s).

At step 612, the manifest customization application 170 defines zero or more other recommended presentations that each identify the video track and a different combination of an audio track and an optional timed text track that are derived from the inclusive media package. At step 614, for each identified track, the manifest customization application 170 generates a track description specifying a subset of the streams in the corresponding stream set, relevant metadata, and locator(s) for the segment(s) of each specified stream At step 616, the manifest customization application 170 generates a different alternate video track summary specifying a language and a video type for each of any number (including none) of the unselected video stream sets in the inclusive media package. At step 618, the manifest customization application 170 generates a manifest file specifying the recommended server device, the recommended presentation(s), the track descriptions, and the one or more alternate video track summaries. At step 620, the manifest customization application 170 transmits the manifest file to the client device. The method 600 then terminates.

Figure 7:
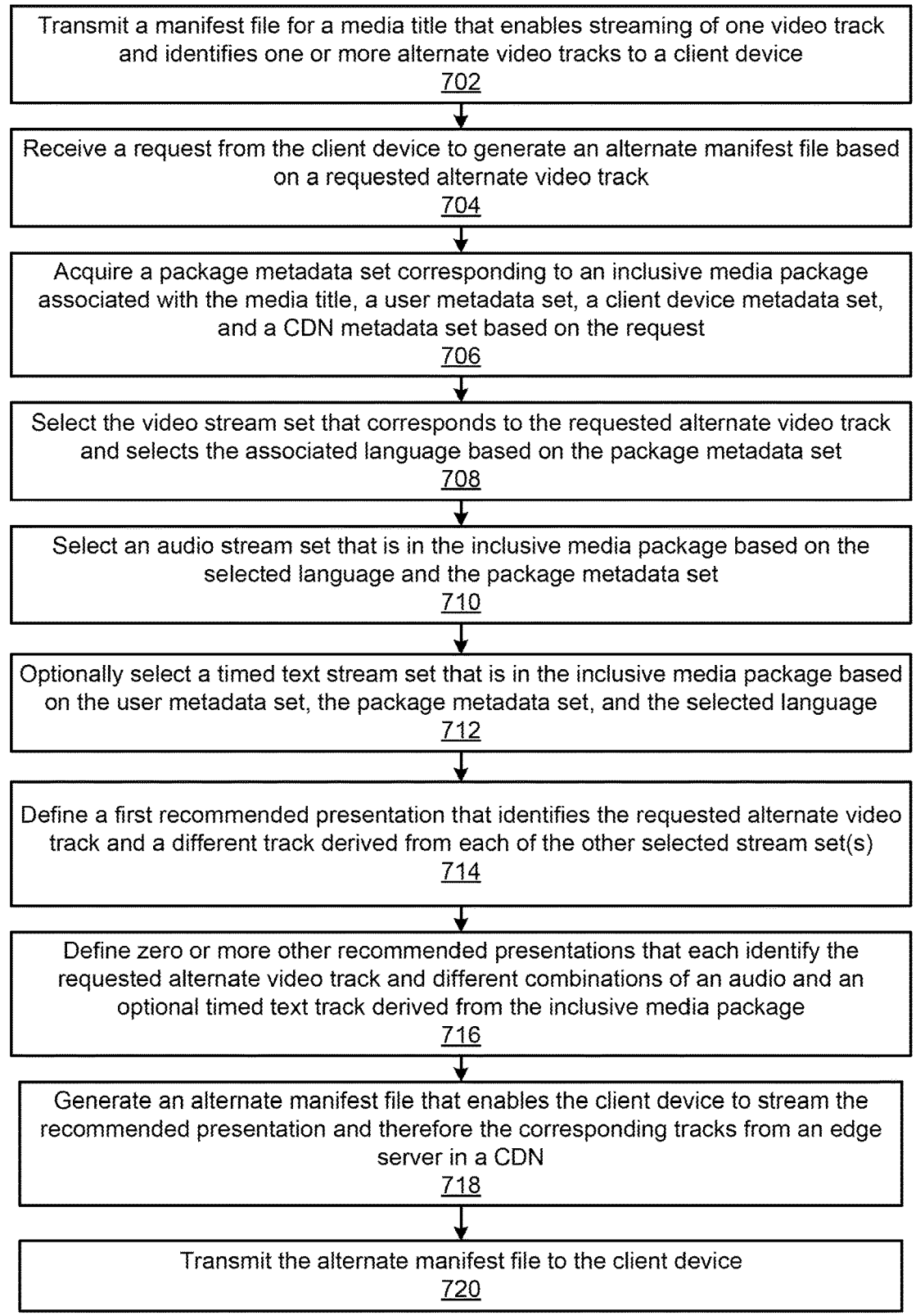
FIG. 7 is a flow diagram of method steps for generating manifest files that enable video tracks to be switched during playback of a media title, according to various embodiments.

FIG. 7 is a flow diagram of method steps for generating a manifest file that enables video tracks to be switched during playback of a media title, according to various embodiments. Although the method steps are described with reference to the systems of FIGS. 1-4, persons skilled in the art will understand that any system configured to implement the method steps, in any order, falls within the scope of the embodiments.

As shown, a method 700 begins at step 702, where the manifest customization application 170 transmits a manifest file that enables streaming of one video track and identifies one or more alternate video tracks to a client device. At step 704, the manifest customization application 170 receives a request from the client device to generate an alternate manifest file that enables streaming of an alternate video track.

At step 706, the manifest customization application 170 acquires a package metadata set corresponding to an inclusive media package associated with the media title, a user metadata set, a client device metadata set, and CDN metadata set 134. At step 708, the manifest customization application 170 selects the video stream set that corresponds to the requested alternate video track and selects the associated language based on the package metadata set.

At step 710, the manifest customization selects an audio stream sets that is in the inclusive media package based on the selected language and the package metadata set At step 712, the manifest customization application 170 optionally selects a timed text stream set that is in the inclusive media package based on the user metadata set, the package metadata set, and the selected language.

At step 714, the manifest customization application 170 defines a first recommended presentation that identifies the recommended video track and a different track derived from each of the other selected stream set(s). At step 716, the manifest customization application 170 defines zero or more other recommended presentations that each identify the recommended video track and different combinations of an audio and an optional timed text track derived from the inclusive media package.

At step 718, the manifest customization application 170 generates an alternate manifest file that enables the client device to stream the recommended presentation and therefore the corresponding tracks from an edge server in a CDN. At step 720, the manifest customization application 170 transmits the alternate manifest file to the client device. The method 700 then terminates.

In sum, the disclosed techniques can be used to generate and deploy an inclusive media package for a media title that enables the media title to be streamed and played back via recommended presentations that are flexibly tailored for different users. In some embodiments, a media title is associated with an original language video file, one or more other video files, one or more audio files, zero or more timed text files, and zero or more other media files. An ingest application included in a media processing pipeline generates a title metadata set identifying and describing any number of characteristics of the media title based on an original language video file associated with the media title. The ingest application adds the title metadata set to an initially empty inclusive media package for the media title. For each media file (including the original language video file), the ingest application generates and adds a corresponding media metadata set to the inclusive media package.

Notably, the media metadata sets describe relevant characteristics of, distinguish between, and define compatibility between the associated stream sets. In particular, each media metadata set specifies a language. And each timed text metadata set can specify an optional timed text type indicating language-based compatibility with video stream sets.

An encoding application included in the media processing pipeline encodes each of the media files one or more times based on different encoding profiles to generate one or more corresponding streams. The encoding application propagates each media metadata set to the corresponding streams and generates a stream metadata set for each stream. The stream metadata sets included in a given stream set describe relevant characteristics of and distinguish between, the associated streams. For each media metadata set, the encoding application generates a corresponding stream set that includes the corresponding streams and stream metadata sets and adds the corresponding stream set to the inclusive media package.

A deployment application included in the media processing pipeline generates a package metadata set that includes the title metadata set, the media metadata sets, and the stream sets. The deployment application stores the package metadata set in a media services database that is accessible to a manifest customization application and any number of other applications included in cloud-based media services. The deployment application stores the inclusive media package in an origin server device. A software application executing on the origin server device provides the inclusive media package on-request to software application executing on server devices included in a CDN.

In some embodiments, the manifest customization application 170 receives a request for a manifest file for the media title from an endpoint application executing on a client device that is associated with a user. In response, the manifest customization application 170 retrieves the package metadata set associated with the media title, a CDN metadata, client device metadata, and user metadata from the media services database. The user can specify any number and/or types of preferences (e.g., a timed text language, a timed text type) associated with the user. The manifest customization application 170 selects one of the video stream sets in the inclusive media package based on the package metadata set and a preference (e.g., a preferred language, a preferred aspect ratio) associated with the user that is specified in the user metadata. The manifest customization application 170 selects at least one of the video streams specified in the selected video stream set for inclusion in a video track and generates one or more recommended presentations based on the video track, the package metadata set, and the user metadata. Each recommended presentation includes the video track and a different combination of an audio track and an optional timed text track. The manifest customization application 170 generates a different alternate video track summary specifying an alternate video track identifier, a language, and a video type based for each of any number (including none) of the unselected video stream sets in the inclusive media package Subsequently, the manifest customization application 170 generates a manifest file that specifies a recommended server device included in the CDN, the recommended presentations, a track description for each track specified in at least one recommended presentation, and zero or more alternate video track summaries. Each track description specifies a track identifier, a language, a media type, the constituent streams, and stream-specific metadata for each constituent stream. The stream-specific metadata for a given constituent stream enables the endpoint application to request each segment of the constituent stream from the recommended server device. Each alternate video track summary provides an opportunity to switch from streaming the video track specified in the recommended presentations to streaming a video track that is associated with a different language. The manifest customization application transmits the manifest file to the endpoint application.

In some embodiments, the endpoint application transmits a request for an alternate manifest file that specifies an alternate video track identifier to the manifest customization application 170 while streaming and playback the media title via one of the recommended presentations. In response, the manifest customization application 170 selects the video stream set included in the inclusive media package based on the alternate video track identifier and the package metadata set. The manifest customization application 170 designates one or more of the video streams specified in the selected video stream set as the alternate video track and generates one or more new recommended presentations that each include the alternate video track based on the package metadata set, and the user metadata. Subsequently, the manifest customization application 170 generates an alternate manifest file that specifies the recommended server device, the new recommended presentations, a track description for each track specified in at least one new recommended presentation, and zero or more alternate video track summaries. The manifest customization application 170 then transmits the alternate manifest file to the endpoint application. Upon receiving the alternate manifest file, the endpoint application switches from streaming a recommended presentation specified in the manifest file to streaming a recommended presentation specified in the alternate manifest file.

At least one technical advantage of the disclosed techniques relative to the prior art is that, with the disclosed techniques, source files are not redundantly processed by the media processing pipeline when generating and deploying a single inclusive media package that more comprehensively represents a media title to a content delivery network relative to conventional video-specific packages. Therefore, the amounts of storage resources, processing resources, and time consumed in generating and deploying a media title can be substantially reduced relative to prior art approaches. Another technical advantage of the disclosed techniques is that, unlike prior art approaches, the tracks specified in a manifest file generated using a single inclusive media package can be selected on-the-fly from all stream sets derived from all source files associated with a corresponding media title based on the preferences of a given user. Therefore, the disclosed techniques are able to generate tracks for playback that more closely align with the preferences of users relative to what can be achieved using prior art approaches where manifest files are generated based on a subset of streams included in a single video-specific package. These technical advantages provide one or more technological advancements over prior art approaches.

1. In some embodiments, a computer-implemented method for generating presentations of media titles for playback comprises selecting a first set of video streams from a plurality of sets of video streams based on a first preference associated with a first user, wherein the plurality of sets of video streams are associated with a media title and are included in a media package; selecting a first set of audio streams from a plurality of sets of audio streams included in the media package based on a second preference associated with the first user; generating a first recommended presentation based on the first set of video streams and the first set of audio streams; and generating a manifest file that allows the media title to be played back in accordance with at least the first recommended presentation.

2. The computer-implemented method of clause 1, wherein the first preference comprises at least one of a preferred language or a preferred aspect ratio.

3. The computer-implemented method of clauses 1 or 2, wherein the first preference comprises a preferred language, and wherein selecting the first set of video streams comprises determining that a first language specified in first metadata associated with the first set of video streams matches the preferred language.

4. The computer-implemented method of any of clauses 1-3, wherein generating the manifest file comprises generating a summary of an alternate video track for inclusion in the manifest file based on metadata associated with a second set of video streams included in the plurality of sets of video streams, wherein the summary of the alternate video track indicates that the alternate video track can be made available.

5. The computer-implemented method of any of clauses 1-4, wherein the second preference comprises a preferred audio language, and wherein selecting the first set of audio streams comprises determining that a first language specified in first metadata associated with the first set of video streams matches the preferred audio language.

6. The computer-implemented method of any of clauses 1-5, wherein generating the first recommended presentation comprises selecting at least one video stream from the first set of video streams for inclusion in a video track; selecting at least one audio stream from the first set of audio streams for inclusion in a first audio track; and grouping the video track and the first audio track to generate the first recommended presentation.

7. The computer-implemented method of any of clauses 1-6, wherein generating the first recommended presentation comprises selecting at least one video stream from the first set of video streams for inclusion in a video track; selecting at least one audio stream from the first set of audio streams for inclusion in a first audio track; selecting at least one timed text stream from a first set of timed text streams for inclusion in a first timed text track; and grouping the video track, the first audio track, and the first timed text track to generate the first recommended presentation.

8. The computer-implemented method of any of clauses 1-7, further comprising, prior to generating the first recommended presentation, selecting the first set of timed text streams from a plurality of sets of timed text streams based on at least one of a third preference associated with the first user or a first language associated with the first set of video streams, wherein the plurality of sets of timed text streams are included in the media package.

9. The computer-implemented method of any of clauses 1-8, wherein generating the manifest file comprises generating a description of a video track that specifies at least one of a different bitrate, a different resolution, a different quality score, or a different locator for each of one or more video streams included in the video track.

10. The computer-implemented method of any of clauses 1-9, wherein a first locator for a first video stream included in the video track comprises a universal record locator associated with a first segment included in the first video stream.

11. In some embodiments, one or more non-transitory computer readable media include instructions that, when executed by one or more processors, cause the one or more processors to generate presentations of media titles for playback by performing the steps of selecting a first set of video streams from a plurality of sets of video streams based on a first preference associated with a first user, wherein the plurality of sets of video streams are associated with a media title and are included in a media package; selecting a first set of audio streams from a plurality of sets of audio streams included in the media package based on a second preference associated with the first user; generating a first recommended presentation based on the first set of video streams and the first set of audio streams; and generating a manifest file that allows the media title to be played back in accordance with at least the first recommended presentation.

12. The one or more non-transitory computer readable media of clause 11, wherein each set of video streams included in the plurality of sets of video streams is derived from a different video source file associated with the media title.

13. The one or more non-transitory computer readable media of clauses 11 or 12, wherein selecting the first set of video streams comprises determining that no set of video streams included in the plurality of sets of video streams is associated with metadata that matches the first preference; and selecting the first set of video streams based on a default video identifier specified in metadata associated with the media title.

14. The one or more non-transitory computer readable media of any of clauses 11-13, wherein generating the manifest file comprises generating a summary of an alternate video track for inclusion in the manifest file based on metadata associated with a second set of video streams included in the plurality of sets of video streams, wherein the summary of the alternate video track indicates that the alternate video track can be made available.

15. The one or more non-transitory computer readable media of any of clauses 11-14, wherein the second preference comprises a preferred audio language, and wherein selecting the first set of audio streams comprises determining that a first language specified in first metadata associated with the first set of video streams matches the preferred audio language.

16. The one or more non-transitory computer readable media of any of clauses 11-15, wherein generating the first recommended presentation comprises selecting at least one video stream from the first set of video streams for inclusion in a video track; selecting at least one audio stream from the first set of audio streams for inclusion in a first audio track; and grouping the video track and the first audio track to generate the first recommended presentation.

17. The one or more non-transitory computer readable media of any of clauses 11-16, wherein generating the first recommended presentation comprises selecting at least one video stream from the first set of video streams for inclusion in a video track; selecting at least one audio stream from the first set of audio streams for inclusion in a first audio track; selecting at least one timed text stream from a first set of timed text streams for inclusion in a first timed text track; and grouping the video track, the first audio track, and the first timed text track to generate the first recommended presentation.

18. The one or more non-transitory computer readable media of any of clauses 11-17, further comprising, prior to generating the first recommended presentation, selecting the first set of timed text streams and a second set of timed text streams from a plurality of sets of timed text streams based on a third preference associated with the first user, wherein the plurality of sets of timed text streams are included in the media package; and determining that the first set of timed text streams, but not the second set of timed text streams, is compatible with the first set of video streams based on a first language associated with the first set of video streams.

19. The one or more non-transitory computer readable media of any of clauses 11-18, wherein generating the manifest file comprises generating a description of a video track that specifies at least one of a different bitrate, a different resolution, a different quality score, or a different locator for each of one or more video streams included in the video track.

20. In some embodiments, a system comprises one or more memories storing instructions and one or more processors coupled to the one or more memories that, when executing the instructions, perform the steps of selecting a first set of video streams from a plurality of sets of video streams based on a first preference associated with a first user, wherein the plurality of sets of video streams are associated with a media title and are included in a media package; selecting a first set of audio streams from a plurality of sets of audio streams included in the media package based on a second preference associated with the first user; generating a first recommended presentation based on the first set of video streams and the first set of audio streams; and generating a manifest file that allows the media title to be played back in accordance with at least the first recommended presentation.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a ""module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory, Flash memory, an optical fiber, a portable compact disc read-only memory, an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for generating presentations of media titles for playback, the method comprising:
    selecting a first set of video streams from a plurality of sets of video streams based on a first preference associated with a first user, wherein the plurality of sets of video streams are associated with a media title and are included in a media package;

selecting a first set of audio streams from a plurality of sets of audio streams included in the media package based on a second preference associated with the first user;

generating a first recommended presentation based on the first set of video streams and the first set of audio streams; and generating a manifest file that allows the media title to be played back in accordance with at least the first recommended presentation.

2. The computer-implemented method of claim 1, wherein the first preference comprises at least one of a preferred language or a preferred aspect ratio.

3. The computer-implemented method of claim 1, wherein the first preference comprises a preferred language, and wherein selecting the first set of video streams comprises determining that a first language specified in first metadata associated with the first set of video streams matches the preferred language.

4. The computer-implemented method of claim 1, wherein generating the manifest file comprises generating a summary of an alternate video track for inclusion in the manifest file based on metadata associated with a second set of video streams included in the plurality of sets of video streams, wherein the summary of the alternate video track indicates that the alternate video track can be made available.

5. The computer-implemented method of claim 1, wherein the second preference comprises a preferred audio language, and wherein selecting the first set of audio streams comprises determining that a first language specified in first metadata associated with the first set of video streams matches the preferred audio language.

6. The computer-implemented method of claim 1, wherein generating the first recommended presentation comprises:

selecting at least one video stream from the first set of video streams for inclusion in a video track;

selecting at least one audio stream from the first set of audio streams for inclusion in a first audio track; and grouping the video track and the first audio track to generate the first recommended presentation.

7. The computer-implemented method of claim 1, wherein generating the first recommended presentation comprises:

selecting at least one video stream from the first set of video streams for inclusion in a video track;

selecting at least one audio stream from the first set of audio streams for inclusion in a first audio track;

selecting at least one timed text stream from a first set of timed text streams for inclusion in a first timed text track; and grouping the video track, the first audio track, and the first timed text track to generate the first recommended presentation.

8. The computer-implemented method of claim 7, further comprising, prior to generating the first recommended presentation, selecting the first set of timed text streams from a plurality of sets of timed text streams based on at least one of a third preference associated with the first user or a first language associated with the first set of video streams, wherein the plurality of sets of timed text streams are included in the media package.

9. The computer-implemented method of claim 1, wherein generating the manifest file comprises generating a description of a video track that specifies at least one of a different bitrate, a different resolution, a different quality score, or a different locator for each of one or more video streams included in the video track.

10. The computer-implemented method of claim 9, wherein a first locator for a first video stream included in the video track comprises a universal record locator associated with a first segment included in the first video stream.

11. One or more non-transitory computer readable media including instructions that, when executed by one or more processors, cause the one or more processors to generate presentations of media titles for playback by performing the steps of:

selecting a first set of video streams from a plurality of sets of video streams based on a first preference associated with a first user, wherein the plurality of sets of video streams are associated with a media title and are included in a media package;

selecting a first set of audio streams from a plurality of sets of audio streams included in the media package based on a second preference associated with the first user;

generating a first recommended presentation based on the first set of video streams and the first set of audio streams; and generating a manifest file that allows the media title to be played back in accordance with at least the first recommended presentation.

12. The one or more non-transitory computer readable media of claim 11, wherein each set of video streams included in the plurality of sets of video streams is derived from a different video source file associated with the media title.

13. The one or more non-transitory computer readable media of claim 11, wherein selecting the first set of video streams comprises:

determining that no set of video streams included in the plurality of sets of video streams is associated with metadata that matches the first preference; and selecting the first set of video streams based on a default video identifier specified in metadata associated with the media title.

14. The one or more non-transitory computer readable media of claim 11, wherein generating the manifest file comprises generating a summary of an alternate video track for inclusion in the manifest file based on metadata associated with a second set of video streams included in the plurality of sets of video streams, wherein the summary of the alternate video track indicates that the alternate video track can be made available.

15. The one or more non-transitory computer readable media of claim 11, wherein the second preference comprises a preferred audio language, and wherein selecting the first set of audio streams comprises determining that a first language specified in first metadata associated with the first set of video streams matches the preferred audio language.

16. The one or more non-transitory computer readable media of claim 11, wherein generating the first recommended presentation comprises:

selecting at least one video stream from the first set of video streams for inclusion in a video track;

selecting at least one audio stream from the first set of audio streams for inclusion in a first audio track; and grouping the video track and the first audio track to generate the first recommended presentation.

17. The one or more non-transitory computer readable media of claim 11, wherein generating the first recommended presentation comprises:

selecting at least one video stream from the first set of video streams for inclusion in a video track;

selecting at least one audio stream from the first set of audio streams for inclusion in a first audio track;

selecting at least one timed text stream from a first set of timed text streams for inclusion in a first timed text track; and grouping the video track, the first audio track, and the first timed text track to generate the first recommended presentation.

18. The one or more non-transitory computer readable media of claim 17, further comprising, prior to generating the first recommended presentation:

selecting the first set of timed text streams and a second set of timed text streams from a plurality of sets of timed text streams based on a third preference associated with the first user, wherein the plurality of sets of timed text streams are included in the media package; and determining that the first set of timed text streams, but not the second set of timed text streams, is compatible with the first set of video streams based on a first language associated with the first set of video streams.

19. The one or more non-transitory computer readable media of claim 11, wherein generating the manifest file comprises generating a description of a video track that specifies at least one of a different bitrate, a different resolution, a different quality score, or a different locator for each of one or more video streams included in the video track.

20. A system comprising:

one or more memories storing instructions; and one or more processors coupled to the one or more memories that, when executing the instructions, perform the steps of:

selecting a first set of video streams from a plurality of sets of video streams based on a first preference associated with a first user, wherein the plurality of sets of video streams are associated with a media title and are included in a media package;

selecting a first set of audio streams from a plurality of sets of audio streams included in the media package based on a second preference associated with the first user;

generating a first recommended presentation based on the first set of video streams and the first set of audio streams; and generating a manifest file that allows the media title to be played back in accordance with at least the first recommended presentation.

* * * * *